United States Patent
Butterworth

[19]
[11] Patent Number: 6,128,049
[45] Date of Patent: Oct. 3, 2000

[54] USE OF SHUTTER TO CONTROL THE ILLUMINATION PERIOD IN A FERROELECTRIC LIQUID CRYSTAL-BASED SPATIAL LIGHT MODULATOR DISPLAY DEVICE

[75] Inventor: Mark M. Butterworth, Santa Clara, Calif.

[73] Assignee: Hewlett-Packard Company, Palo Alto, Calif.

[21] Appl. No.: 09/240,283

[22] Filed: Jan. 29, 1999

[51] Int. Cl.[7] .................................................. G02F 1/1335
[52] U.S. Cl. ......................................... 349/5; 349/8
[58] Field of Search ................... 349/5, 8, 7, 9

[56] References Cited

U.S. PATENT DOCUMENTS

| | | | |
|---|---|---|---|
| 5,260,815 | 11/1993 | Takizawa | 349/5 |
| 5,357,288 | 10/1994 | Hiroshima et al. | 349/7 |
| 5,801,814 | 9/1998 | Matsumoto | 349/8 |

*Primary Examiner*—Walter Malinowski

[57] ABSTRACT

A ferroelectric liquid crystal-based display device comprising a light source, a reflective spatial light modulator, a light output, a beam splitter, and a shutter. The beam splitter is located and aligned relative to the light source, the light output, and the spatial light modulator such that light generated by the light source is reflected or transmitted towards the spatial light modulator, and then light reflected by the spatial light modulator is reflected or transmitted towards the light output. The shutter has both and OPEN and a CLOSED state, and may include ferroelectric liquid crystal material. The shutter may be located and aligned relative to the lights source and the beam splitter such that when OPEN it transmits the light generated by the light source towards the beam splitter, and when CLOSED it prevents transmission of the light generated by the light source towards the beam splitter. Alternatively, the shutter may be located and aligned relative to the light output and the beam splitter such that when OPEN it transmits the light reflected by the spatial light modulator towards the light output, and when CLOSED it prevents transmission of the light reflected by the spatial light modulator towards the light output. A color separator and a first, second and third reflective spatial light modulators may be used in place of the above-described spatial light modulator. The color separator is located and aligned such that a first, second, and third wavelength band from the light generated by the light source, after being transmitted or reflected by the beam splitter, is transmitted or reflected towards the first, second, and third reflective spatial light modulators, respectively. Each of the first, second, and third reflective spatial light modulators include ferroelectric liquid crystal material.

28 Claims, 22 Drawing Sheets

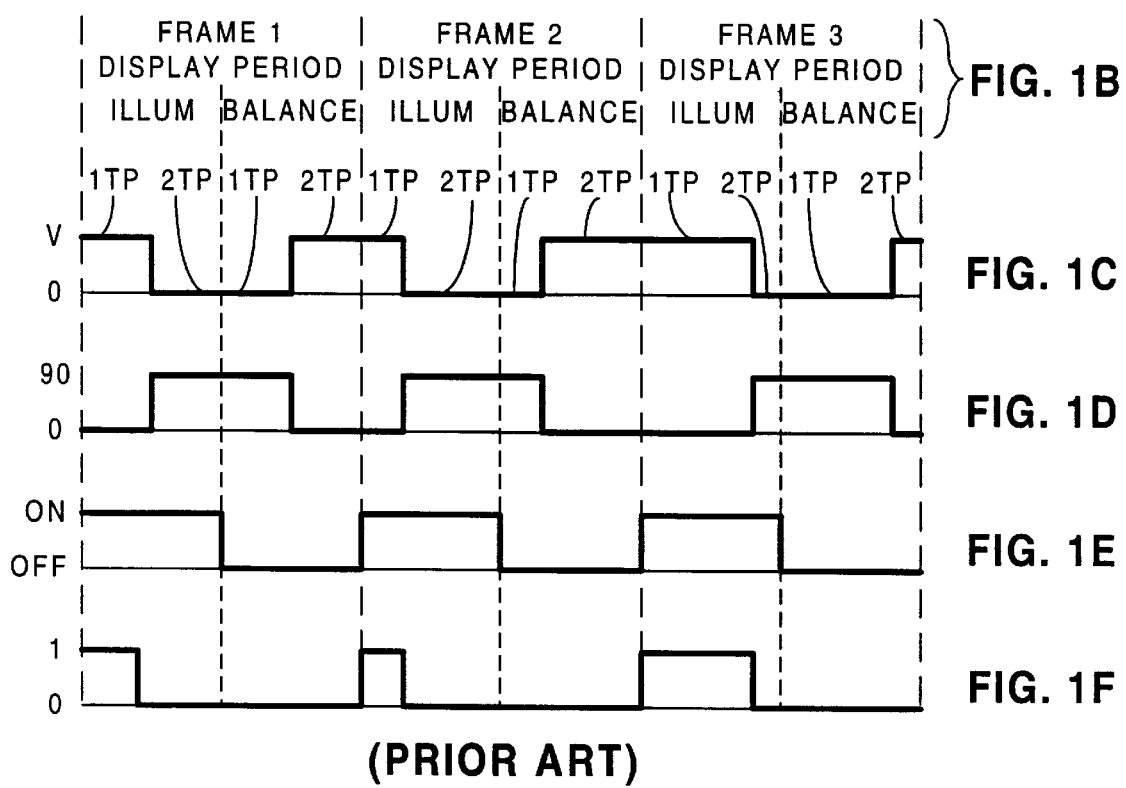
(PRIOR ART)

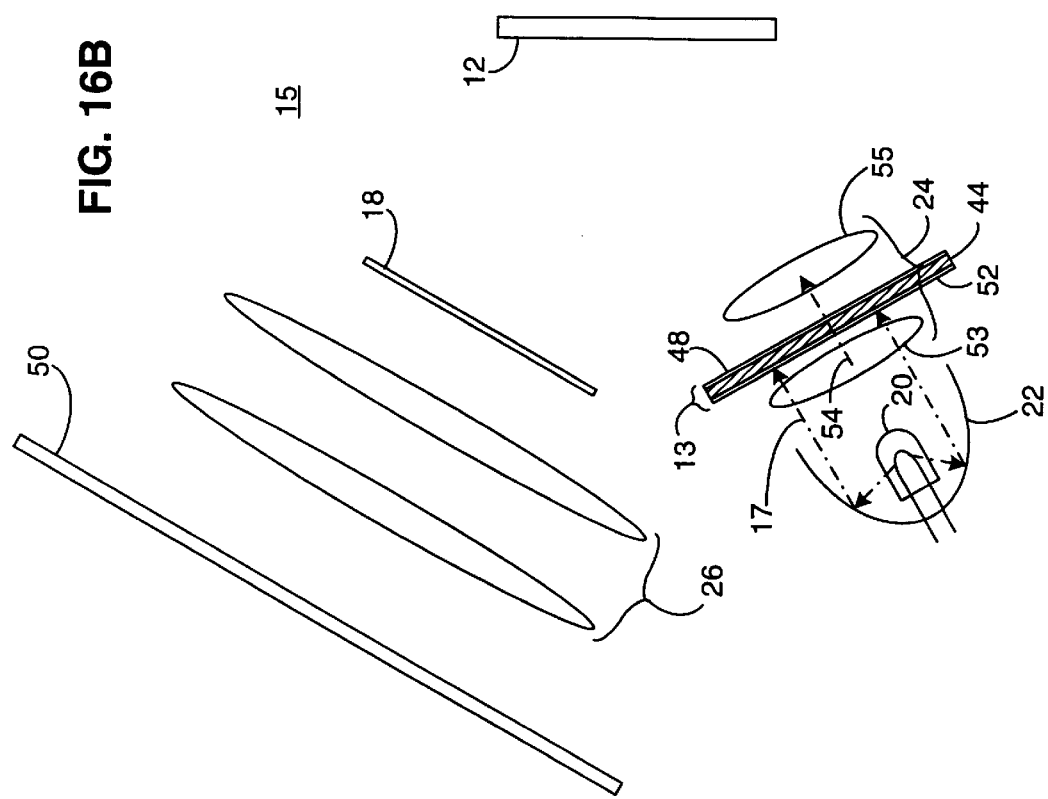
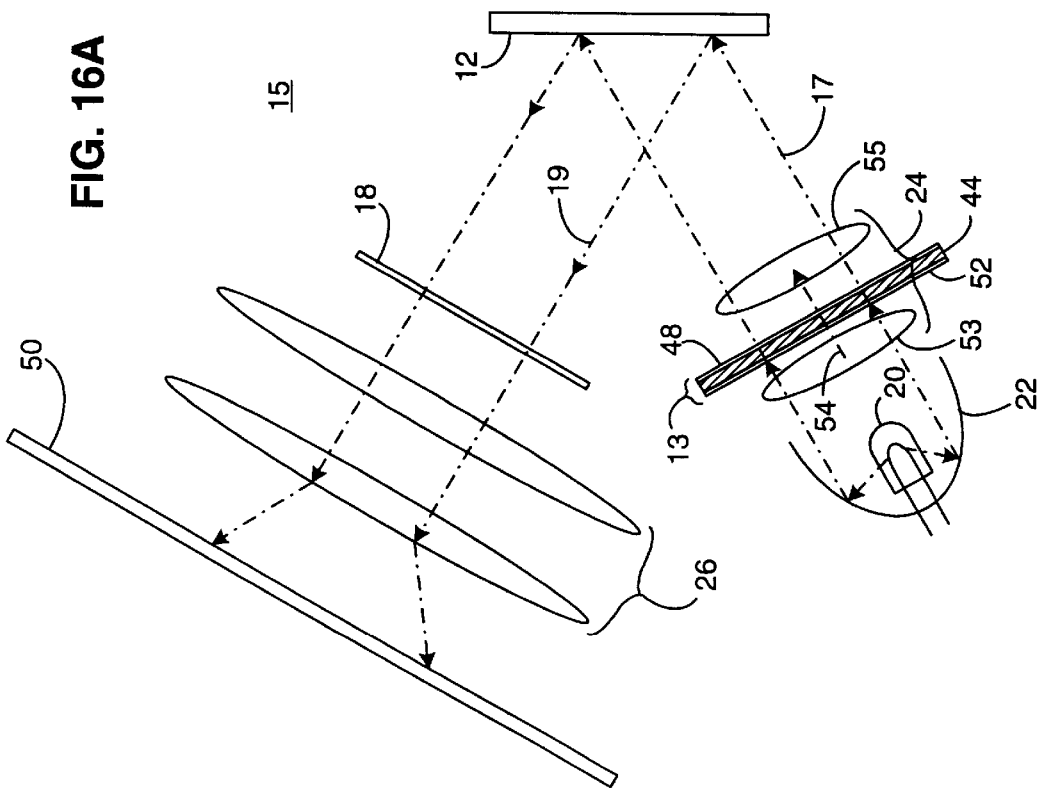

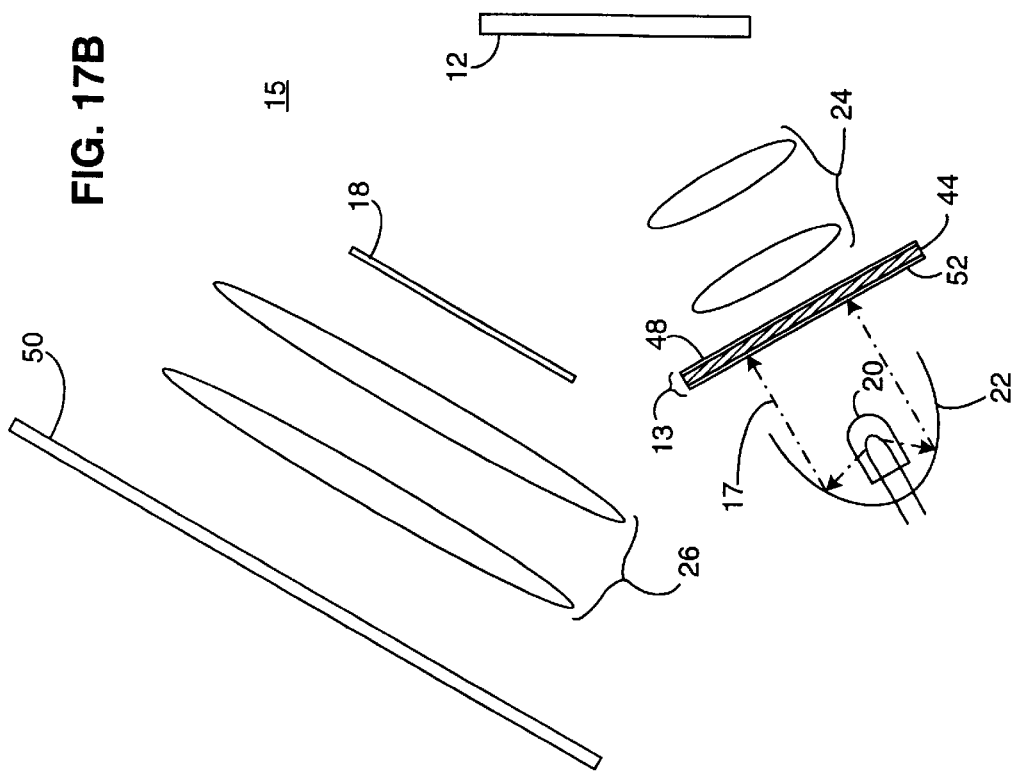
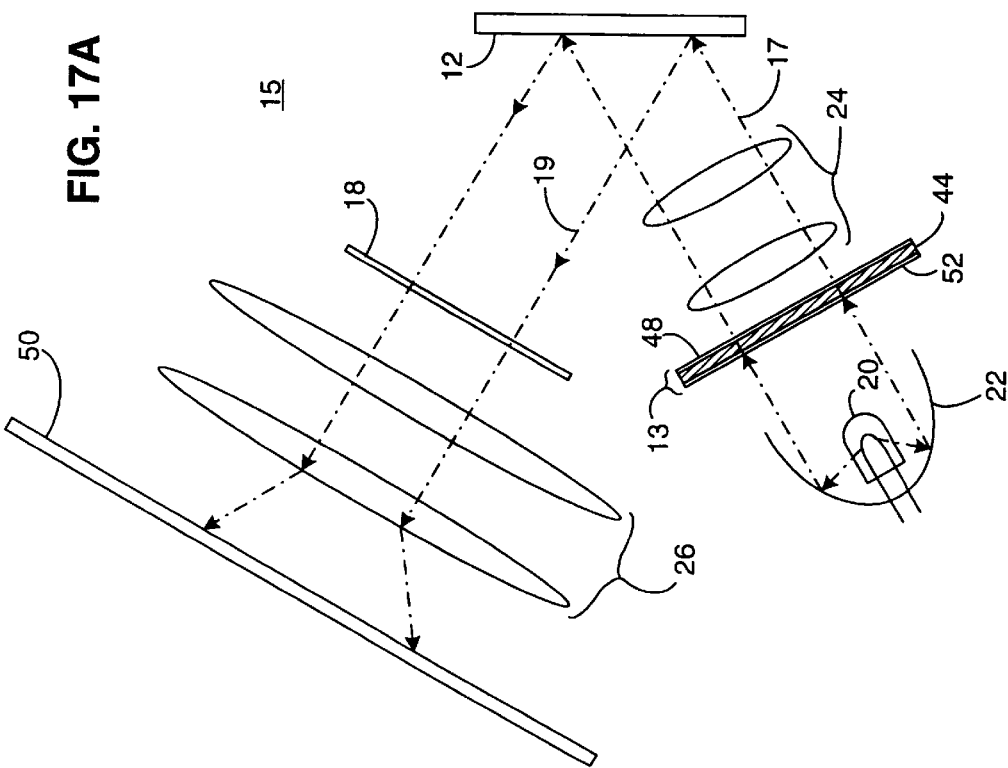

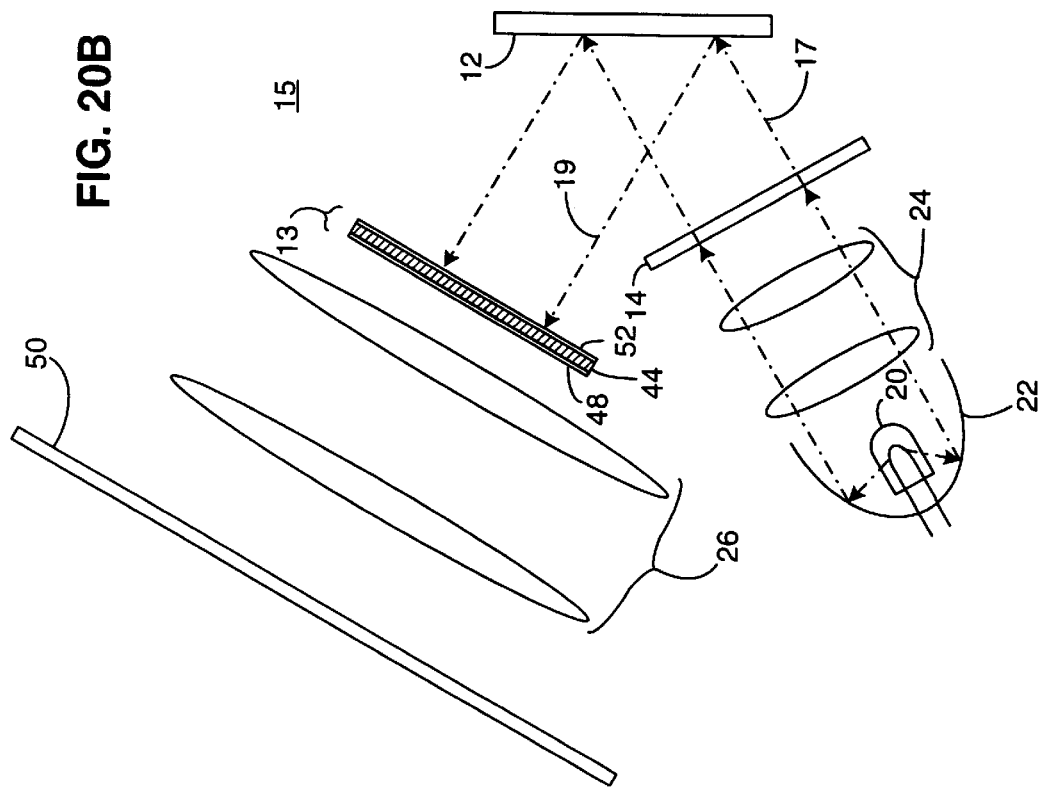
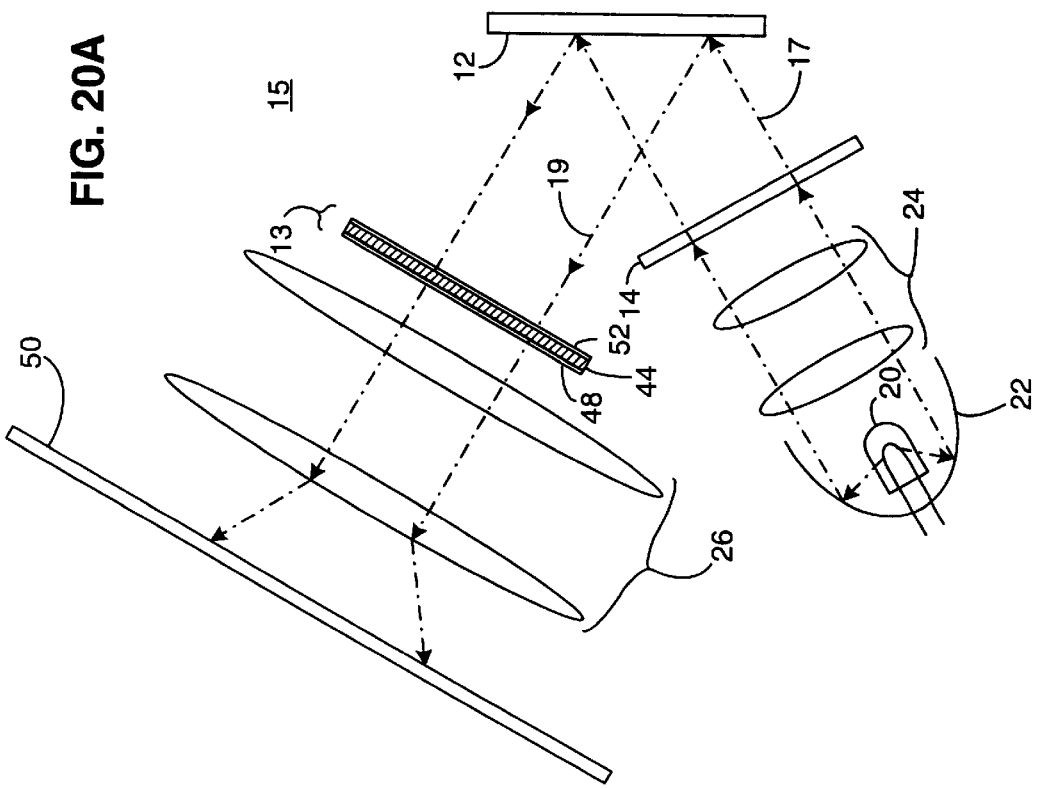

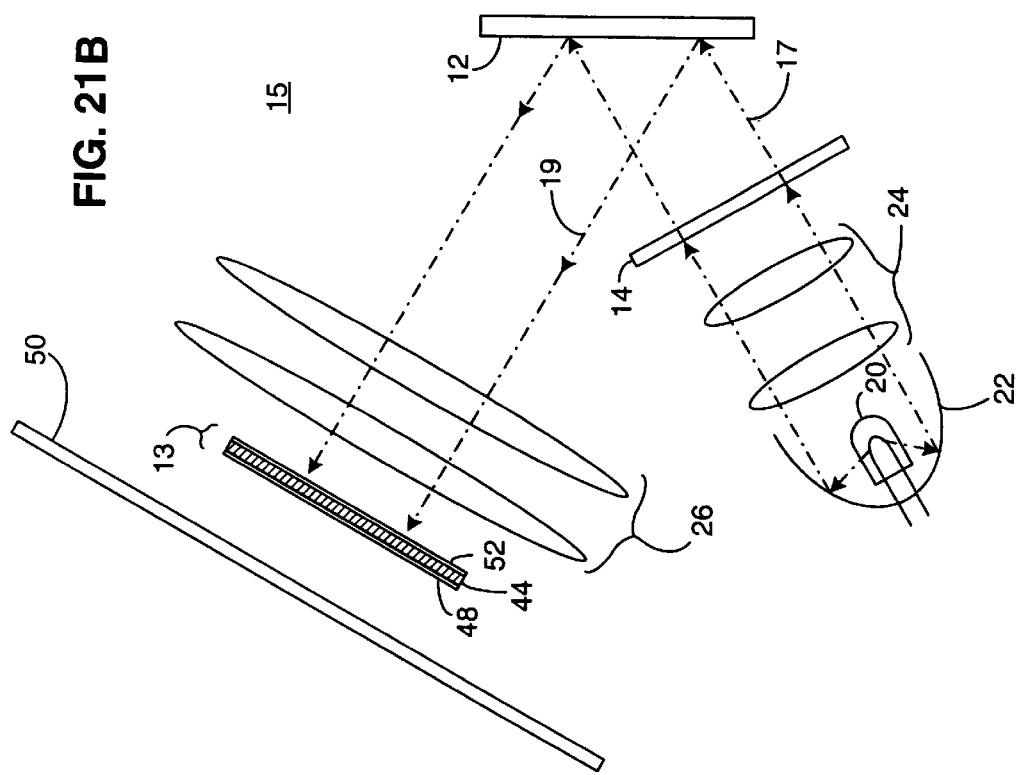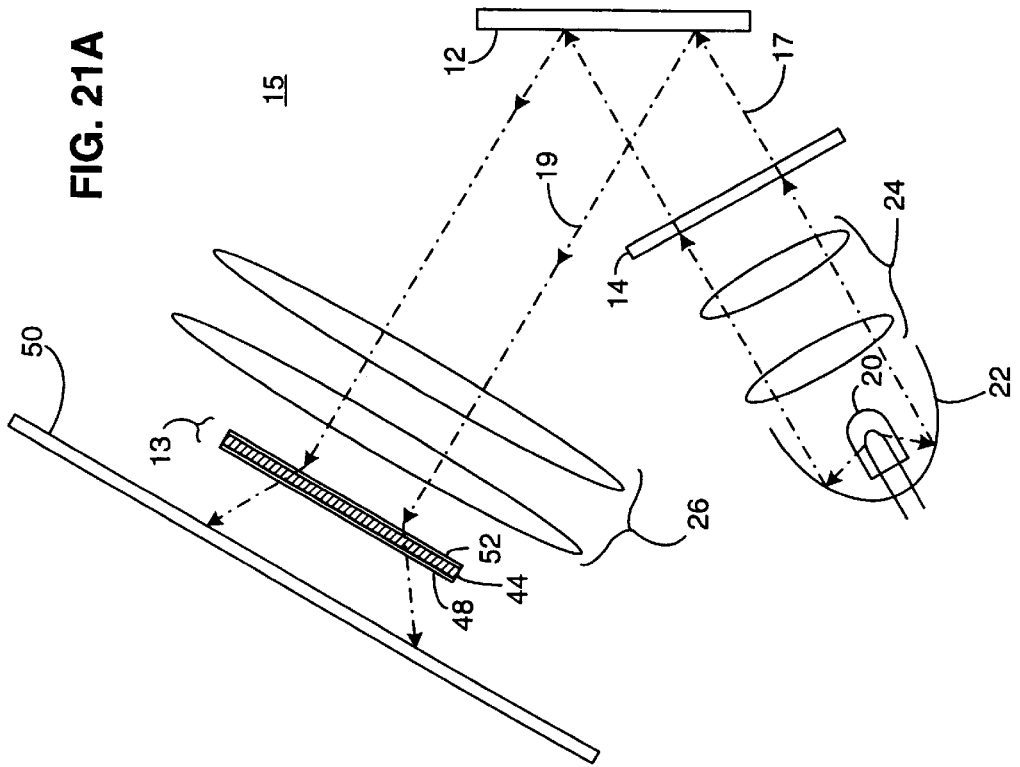

USE OF SHUTTER TO CONTROL THE ILLUMINATION PERIOD IN A FERROELECTRIC LIQUID CRYSTAL-BASED SPATIAL LIGHT MODULATOR DISPLAY DEVICE

FIELD OF THE INVENTION

The invention relates to display systems utilizing a reflective ferroelectric liquid crystal-based light valve and specifically to the use of a shutter in such systems.

BACKGROUND OF THE INVENTION

A need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. A need also exists for a replacement for the conventional cathode-ray tube used in many display devices including computer monitors, conventional and high-definition television receivers and large-screen displays. Both of these needs can be satisfied by display devices that incorporate a light valve that uses as its light control element a reflective spatial light modulator based on a surface-stabilized ferroelectric liquid crystal (SSFLC) material.

A SSFLC-based reflective spatial light modulator is composed of a layer of a SSFLC material sandwiched between a transparent electrode and a reflective electrode. The reflective electrode is segmented into an array of pixel electrodes to define the picture elements (pixels) of the spatial light modulator. The reflective electrode can be on a silicon substrate that also accommodates the drive circuits that derive the drive signals for the pixel electrodes from the input video signal. The direction of an electric field applied between each pixel electrode and the other electrode determines whether or not the corresponding pixel of the spatial light modulator rotates the direction of polarization of light falling on the pixel. The spatial light modulator is constructed as a quarter-wave plate and rotates the direction of polarization through 90° so that the polarized light reflected by the pixels of the spatial light modulator either passes through a polarization analyzer or is absorbed by the polarization analyzer, depending on the direction of the electric field applied to each pixel. The resulting optical characteristics of each pixel of the spatial light modulator are binary: the pixel either reflects light (its 1 state) or absorbs light (its 0 state), and therefore appears light or dark, depending on the direction of the electric field.

To produce the grey scale required for conventional display devices, the apparent brightness of each pixel is varied by temporally modulating the light transmitted by each pixel. The light is modulated by defining a basic time period that will be called the illumination period of the spatial light modulator. The pixel electrode is driven by a drive signal that switches the pixel from its 1 state to its 0 state. The duration of the 1 state relative to the duration of the illumination period determines the apparent brightness of the pixel.

Ferroelectric liquid crystal-based spatial light modulators suffer the disadvantage that, after each time the drive signal has been applied to a pixel electrode to cause the pixel to modulate the light reflected by it, the DC balance of the pixel must be restored. This is done by defining a second basic time period called the balance period, equal in duration to the illumination period, and driving the pixel electrode with a complementary drive signal having 1 state and 0 state durations that are complementary to the 1 state and 0 state durations of the drive signal during the illumination period. The illumination period and the balance period collectively constitute a display period.

To prevent the complementary drive signal from causing the display device to display a substantially uniform, grey image, the light illuminating the light valve may be modulated so that the light valve is only illuminated during the illumination period, and is not illuminated during the balance period. One way that the light may be modulated is by modulating the light source itself. Modulating the light source works well with fast-acting light sources such as Light Emitting Diodes (LEDs), but has not worked well with slower-acting light sources, such as arc-lamps. Modulating the light from these slow-acting light sources for use with the ferroelectric liquid crystal based spatial light modulators has been problematic.

FIG. 1A shows part of a conventional display device 5 incorporating a conventional reflective light valve 10 that includes the reflective spatial light modulator 12. Other principal components of the light valve are the polarizer 14, the beam splitter 16 and the analyzer 18. The light valve is illuminated with light from the light source 20, the light from which is concentrated on the polarizer using a reflector 22 and collector optics 24. The light output by the light valve passes to the imaging optics 26 that focus the light to form an image (not shown). The light valve, light source and imaging optics may be incorporated into various types of display device, including miniature, wearable devices, cathode-ray tube replacements, and projection displays.

In general terms, light generated by the light source 20 passes through the polarizer 14. The polarizer polarizes the light output from the light source. The beam splitter 16 reflects a fraction of the polarized light output from the polarizer towards the spatial light modulator 12. The spatial light modulator 12 is divided into a two-dimensional array of picture elements (pixels) that define the spatial resolution of the light valve 10. Light reflected from the spatial light modulator can pass to the beam splitter 16 which transmits a fraction of the reflected light to the analyzer 18.

The direction of an electric field in each pixel of the spatial light modulator 12 determines whether or not the direction of polarization of the light reflected by the pixel is rotated by 9° relative to the direction of polarization of the incident light. The light reflected by each pixel of the spatial light modulator passes through the beam splitter 16 and the analyzer 18 and is output from the light valve 10 through the imaging optics 26 depending on whether or not its direction of polarization was rotated by the spatial light modulator.

More specifically, the polarizer 14 polarizes the light generated by the light source 20 that passes through the collector optics 24 either directly or after reflecting off reflector 22. The polarization is preferably linear polarization. The beam splitter 16 reflects the polarized light output from the polarizer towards spatial light modulator 12, and the polarized light reflected from the spatial light modulator transmits to the analyzer 18 through the beam splitter 16. The direction of maximum transmission of the analyzer is orthogonal to that of the polarizer in this example.

The spatial light modulator 12 is composed of the transparent electrode 28 deposited on the surface of the transparent cover 30, the reflective electrode 32 located on the surface of the semiconductor substrate 34, and the surface-stabilized ferroelectric liquid crystal (SSFLC) layer 36 sandwiched between the transparent electrode and the reflective electrode. The reflective electrode is divided into a two-dimensional array of pixel electrodes that define the pixels of the spatial light modulator and of the light valve. A substantially reduced number of pixel electrodes are shown to simplify the drawing. For example, in a light valve for use in a large-screen computer monitor, the reflective electrode could be divided into a two-dimensional array of 1600×1200 pixel electrodes. An exemplary pixel electrode is shown at 38. Each pixel electrode reflects the portion of the incident polarized light that falls on it towards the beam splitter 16.

A drive circuit (not shown), which may be located in the semiconductor substrate 34, applies a drive signal to the pixel electrode 38 of each pixel of the spatial light modulator 12. The drive signal has two different voltage levels, and the transparent electrode 28 is maintained at a fixed potential mid-way between the voltage levels of the drive signal. The potential difference between the pixel electrode and the transparent electrode establishes an electric field across the part of the liquid crystal layer 36 between the pixel and transparent electrodes. The direction of the electric field determines whether the liquid crystal layer rotates the direction of polarization of the light reflected by the pixel electrode, or leaves the direction of polarization unchanged.

Since light passes through the reflective spatial light modulator twice, once before and once after reflection by the reflective pixel electrodes, the reflective spatial light modulator 12 is structured as a quarter-wave plate. The thickness of the layer of ferroelectric liquid crystal material in the liquid crystal layer 36 is chosen to provide an optical phase shift of 90° between light polarized parallel to the director of the liquid crystal material and light polarized perpendicular to the director. The liquid crystal material is preferably a Smectic C* ferroelectric liquid crystal material having an angle of 22.5° between its director and the normal to its smectic layers. Reversing the direction of the electric field applied to such a liquid crystal material switches the director of the material through an angle of about 45°. Consequently, if the director is aligned parallel to the direction of maximum transmission of the analyzer 18 with one polarity of the electric field, reversing the direction of the electric field will rotate the direction of polarization of light reflected by the pixel through 90°. This will align the direction of polarization of the light perpendicular to the direction of maximum transmission of the analyzer, and will change the pixel from its 1 state, in which the pixel appears bright, to its 0 state, in which the pixel appears dark.

In a miniature, wearable display, the imaging optics 26 are composed of an eyepiece that receives the light reflected by the reflective electrode 32 and forms a virtual image at a predetermined distance in front of the user (not shown). In a cathode-ray tube replacement or in a projection display, the imaging optics are composed of projection optics that focus an image of the reflective electrode on a transmissive or reflective screen (not shown). Optical arrangements suitable for use as an eyepiece or projection optics are well known in the art and will not be described here.

Since the direction of maximum transmission of the analyzer 18 is orthogonal to the direction of polarization defined by the polarizer 14, light whose direction of polarization has been rotated through 90° by a pixel of the spatial light modulator 12 will pass through the analyzer and be output from the light valve 10 whereas light whose direction of polarization has not been rotated will not pass through the analyzer. The analyzer only transmits to the imaging optics 26 light whose direction of polarization has been rotated by pixels of the spatial light modulator. The pixels of the spatial light modulator will appear bright or dark depending on the direction of the electric field applied to each pixel. When a pixel appears bright, it will be said to be in its 1 state, and when the pixel appears dark, it will be said to be in its 0 state.

The direction of maximum transmission of the analyzer 18 can alternatively be arranged parallel to that of the polarizer 14, and a non-polarizing beam splitter can be used as the beam splitter 16. In this case, the spatial light modulator 12 operates in the opposite sense to that just described.

To produce the grey scale required by a display device notwithstanding the binary optical characteristics of the pixels of the light valve 10, the apparent brightness of each pixel is varied by temporally modulating the light reflected by the pixel, as described above. The drive circuit (not shown) for each pixel of the spatial light modulator determines the duration of the 1 state of the pixel in response to a portion of the input video signal 40 corresponding to the location of the pixel in the spatial light modulator.

FIGS. 1B–1F illustrate the operation of the exemplary pixel 38 of the conventional light valve 10 shown in FIG. 1A during three consecutive display periods. The remaining pixels operate similarly. In one embodiment of a conventional light valve, each display period corresponded to one frame of the input video signal 40. In another embodiment, each display period corresponded to a fraction of one frame of the input video signal. Each display period is composed of an illumination period (ILLUM) and a balance period (BALANCE) having equal durations, as shown in FIG. 1B.

FIG. 1C shows the drive signal applied to the exemplary pixel electrode 38. The transparent electrode 28 is held at a voltage level of V/2, so that changing the voltage level on the pixel electrode from 0 to V reverses the direction of the electric field applied to the ferroelectric liquid crystal layer 36. The level of the drive signal is V for a first temporal portion 1T of each illumination period. The level of the drive signal is 0 for the second temporal portion 2TP constituting the remainder of the illumination period, and also for the first temporal portion 1T of the subsequent balance period. The first temporal portion of the balance period has a duration equal to the first temporal portion of the illumination period. However, the level of the drive signal is 0 during the first temporal portion of the balance period, whereas the level of the drive signal is V during the first temporal portion of the illumination period. Finally, the level of the drive signal changes to V for the second temporal portion 2TP constituting the remainder of the balance period. Consequently, during the balance period, the level of the drive signal is 0 and V for times equal to the times that it was at V and 0, respectively, during the illumination period. As a result, the electric field applied to the liquid crystal material of the pixel averages to zero over the display period.

In the example shown, the duration of the first temporal portion 1TP of the drive signal is different in each of the three illumination periods. The duration of the first temporal portion, and, hence, of the second temporal portion, of each illumination period depends on the voltage level of the corresponding sample of the input video signal 40.

FIG. 1D shows the effect of the spatial light modulator 12 on the direction of polarization of the light impinging on the analyzer 18. The direction of polarization is indicated by the absolute value of the angle α between direction of polarization of the light impinging on the analyzer and the direction of maximum transmissivity of the analyzer. The analyzer transmits light having an angle α close to zero and absorbs light having an angle α close to 90°. In each display period, the angle a has values corresponding to the pixel being bright and dark for equal times due to the need to restore the DC balance of the pixel.

FIG. 1E shows the condition of a fast-acting light source 20. The light source is ON throughout the illumination period of each display period, and is OFF during the following balance period.

FIG. 1F shows the light output from the exemplary pixel of the light valve 10 controlled by the pixel electrode 38. Light is output from the pixel only during the first temporal portion of the illumination period of each display period. No light is output during the second temporal portion of the illumination period. Moreover, no light is output during the balance period of the display period because the light source 20 is OFF during the balance period.

The light valve 10 can also be adapted to provide a colored light output to the imaging optics 26. One way that this can be done is by either replacing the "white" light source 20 with three colored light sources such as a red, blue and green LEDs, each illuminating the spatial light modulator sequentially. Another way that a colored light output can be provided is by replacing the single spatial light modulator 12 depicted in FIG. 1A with a series of three dichroic plates 42, each having an associated reflective spatial light modulator 12, as shown in FIG. 2. Each of the dichroic plates is configured to reflect light in a band of wavelengths particular to that dichroic plate and to pass the remaining wavelengths of light. Thus, if the light source 20 is a "white" light, emitting visible light across the entire color spectrum, a particular portion of the color spectrum may be reflected by each dichroic plate its associated reflective spatial light modulator simultaneously. This eliminates the need for sequential illumination and improves the perceived brightness of the color pixels passing through the analyzer.

For example, the dichroic plate 42 nearest the beam splitter 16 might reflect red colored light toward its associated spatial light modulator 12 while the center dichroic plate reflects green colored light toward its associated spatial light modulator and the dichroic plate remote from the beam splitter reflects blue colored light towards its spatial light modulator. When the light source 20 is ON, as shown if FIG. 2, the colored light reflected by the dichroic plates passes to each of the three reflective spatial light modulators 12. Each of the three reflective spatial light modulators is capable of reflecting pixels of the colored light back at its associated dichroic plate in a manner consistent with the above description of the operation of the spatial light modulator shown in FIG. 1A.

The majority of the colored light reflected by each of the spatial light modulators 12 will be reflected by associated dichroic plate toward the analyzer 18 since the light reflected by each spatial light modulator will retain the characteristic wavelengths of lights originally reflected by the dichroic plates. When the individual colored light from each of the three reflective spatial light modulators 12 pass through the analyzer, they are combined and a full color image can be formed by the imaging optics 26.

The use of bright "white" light sources with reflective spatial light modulators is desirable, particularly in applications intended to replace the conventional cathode-ray tube used in many display devices including computer monitors, conventional and high-definition television receivers and large-screen displays. Most bright "white" light sources tend to be slower-acting, however, and can not be directly modulated effectively. Indirect modulation of bright light sources has been accomplished using mechanical shutters in the motion picture industry. Mechanical shutters include blade, curtain, and plate shutters. Due to their mechanical nature, however, such shutters are often too large, noisy, and power-consuming to be used effectively in may display applications.

A SSFLC-based shutter is also known in the art and is described in U.S. Pat. No. 5,029,987 issued Jul. 9, 1991 and entitled "Ferroelectric liquid crystal shutter." A detailed view of a SSFLC-based shutter 13 is shown in FIG. 3. In general terms, SSFLC-based shutters are composed of a layer of a SSFLC material 44 (shown with hash marks for clarity) sandwiched between an input transparent electrode 52 including an input polarizing layer 58 and an output transparent electrode 48 including an output polarizing layer 46 (polarizing layers shown with hash marks for clarity). The SSFLC-based shutter 13 is constructed as a half-wave plate and depending on the direction of an electric field applied between the input transparent electrode 52 and the output transparent electrode 48, either rotates the direction of polarization of light entering the shutter 13 through 90° or maintains the direction of polarization. Thus, the direction of the electric field applied between the input transparent electrode 52 and the output transparent electrode 48 along with the direction of polarization of the input polarizing layer 58 relative to the direction of polarization of the output polarizing layer 46 determines whether the shutter transmits or blocks light from the light source (not shown). For example, if the direction of polarization of the output polarizing layer 46 is orthogonal to the direction of polarization of the input polarizing layer 58, the shutter 13 will transmit light when the shutter rotates the direction of polarization by 90° (its OPEN state) and will absorb light when the direction of polarization is not rotated (its CLOSED state). Alternatively, if the direction of polarization of the output polarizing layer 46 is parallel to the direction of polarization of the input polarizing layer 58, the shutter 13 will transmit light when the direction of polarization is not rotated (its OPEN state) and will absorb light when the direction of polarization is rotated by 90° (its CLOSED state). The resulting optical characteristics of the shutter are binary: the shutter either transmits light (its OPEN state) or absorbs light (its CLOSED state), depending on the direction of the electric field.

Consequently, what is needed is a reflective ferroelectric liquid crystal-based light valve where the duration of the illumination period is controlled with a shutter.

SUMMARY OF THE INVENTION

The invention provides a light valve that comprises a light source, a ferroelectric liquid crystal-based reflective spatial light modulator, a light output, and a shutter. Some of the light generated by the light source is directed along an illumination optical path towards the reflective light modulator. Some of the light reflected by the spatial light modulator is directed along an output optical path towards the light output. Whether or not the light generated by the light source reaches the light output is determined, in part, by the condition of the shutter.

The shutter has both and OPEN and a CLOSED state, and may include ferroelectric liquid crystal material. The shutter may be located and aligned along the illumination optical path, such that when OPEN it transmits the light generated by the light source along the illumination optical path towards the reflective spatial light modulator, and when CLOSED it prevents transmission of the light generated by the light source along the illumination optical path beyond the shutter. Alternatively, the shutter may be located and aligned along the output optical path such that when OPEN it transmits the light reflected by the spatial light modulator along the output optical path towards the light output, and when CLOSED it prevents transmission of the light reflected by the spatial light modulator along the along the output optical path beyond the shutter.

The invention may also provide a beam splitter that may have orthogonal directions of maximum transmissivity and maximum reflectivity. The beam splitter may be located along the illumination optical path and along the output optical path. The beam splitter may also be located and aligned relative to the shutter, the light output, and the spatial light modulator to do one of reflect and transmit the light transmitted by the shutter in the OPEN state towards the spatial light modulator, and to do the other of reflect and transmit towards the light output the light reflected by the spatial light modulator. Alternatively, the beam splitter may be located and aligned relative to the shutter, the light source, and the spatial light modulator to do one of reflect and transmit the light generated by the light source towards the spatial light modulator, and to do the other of reflect and transmit towards the shutter the light reflected by the spatial light modulator.

The invention may also provide collector optics that are located along the illumination optical path to concentrate the light generated by the light source along the illumination optical path. The invention may also provide imaging optics that are located along the output optical path to focus the light reflected by the light modulator for display. The shutter may be located between the light source and the collector optics, between the collector optics and the spatial light modulator, or along a collector optical path connecting a collector input lens which faces the light source to a collector output lens which faces the beam splitter. Additionally the shutter may be located between the light output and the imaging optics, between the imaging optics and the spatial light modulator, or along the imaging optical path connecting an imaging input lens optically facing the spatial light modulator to an imaging output lens optically facing the light output.

The invention may further provide that a color separator and first, second and third reflective spatial light modulators be used in place of the above-described spatial light modulator. The color separator is located and aligned such that a first, second, and third wavelength band from the light generated by the light source, after being transmitted or reflected by the beam splitter, is transmitted or reflected towards the first, second, and third reflective spatial light modulators, respectively. Each of the first, second, and third reflective spatial light modulators include ferroelectric liquid crystal material.

Accordingly, the light valve according to the invention uses a single shutter which transmits light only once in either the illumination optical path or in the output optical path to control the duration of the illumination period. Other features and advantages of the present invention will become apparent from the following detailed description, taken in conjunction with the accompanying drawings, illustrating, by way of example, the principles of the invention.

BRIEF DESCRIPTION OF THE DRAWINGS

FIGS. 1B–1F illustrate the operation of the display device shown in FIG. 1A.

FIG. 16A is a schematic diagram of a display device according to the invention with a single reflective spatial light modulator and a shutter in the OPEN state located within the collector optics.

FIG. 16B is a schematic diagram of the display device depicted in FIG. 16A with the shutter in the CLOSED state.

FIG. 17A is a schematic diagram of a display device according to the invention with a single reflective spatial light modulator and a shutter in the OPEN state located between the collector optics and the light source.

FIG. 17B is a schematic diagram of the display device depicted in FIG. 17A with the shutter in the CLOSED state.

FIG. 20A is a schematic diagram of a display device according to the invention with a single reflective spatial light modulator and a shutter in the OPEN state located between the imaging optics and the beam splitter.

FIG. 20B is a schematic diagram of the display device depicted in FIG. 20A with the shutter in the CLOSED state.

FIG. 21A is a schematic diagram of a display device according to the invention with a single reflective spatial light modulator and a shutter in the OPEN state located between the imaging optics and the light output.

FIG. 21B is a schematic diagram of the display device depicted in FIG. 21A with the shutter in the CLOSED state.

DETAILED DESCRIPTION OF THE INVENTION

Figure 1A:
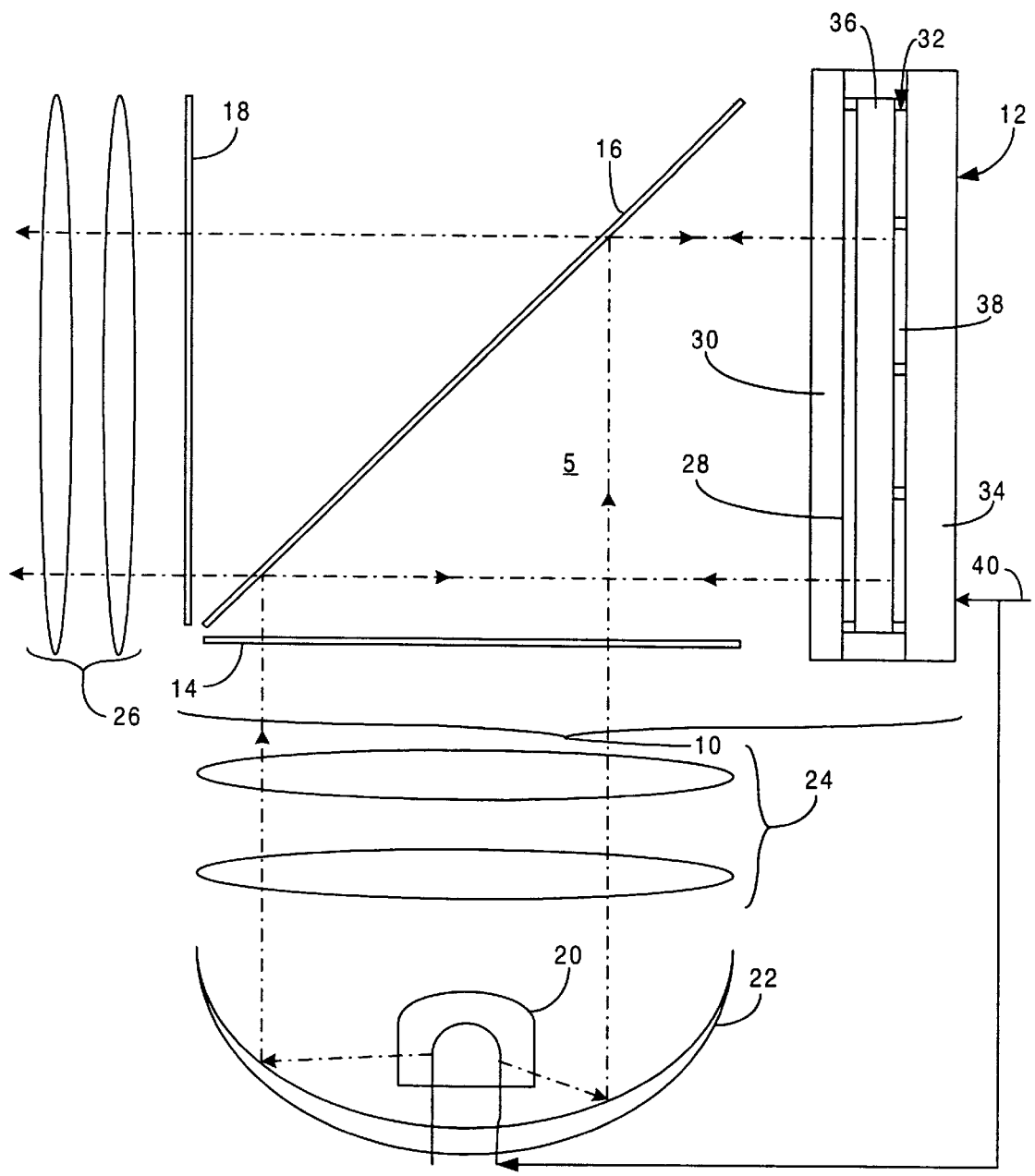
FIG. 1A is a schematic diagram of a prior art display device incorporating a reflective spatial light modulator in which the illumination period is controlled by directly modulating the light source.
Figure 2:
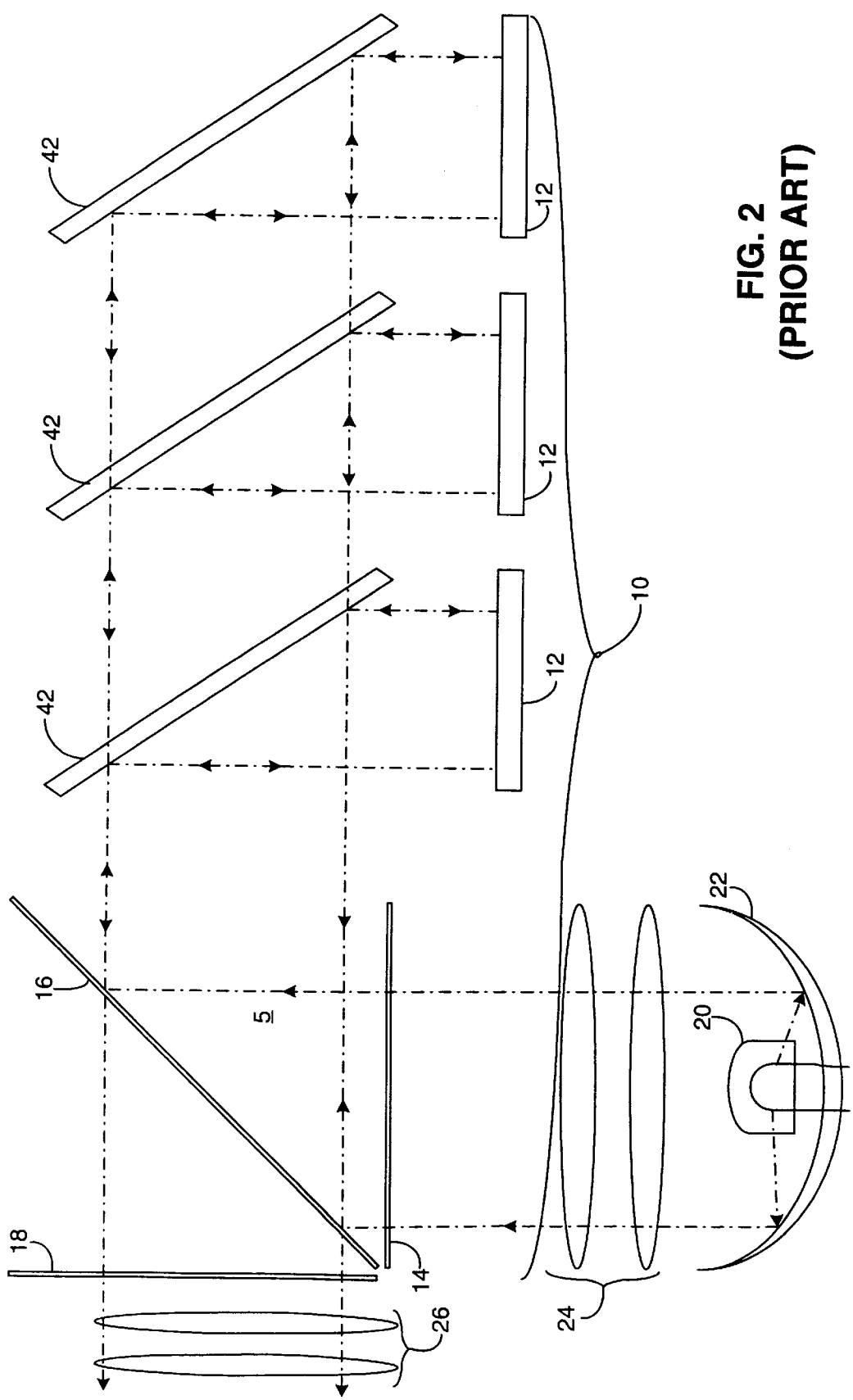
FIG. 2 is a schematic diagram of prior art display device incorporating dichroic plates and three spatial light modulators in which the illumination period is controlled by directly modulating the light source.
Figure 3:
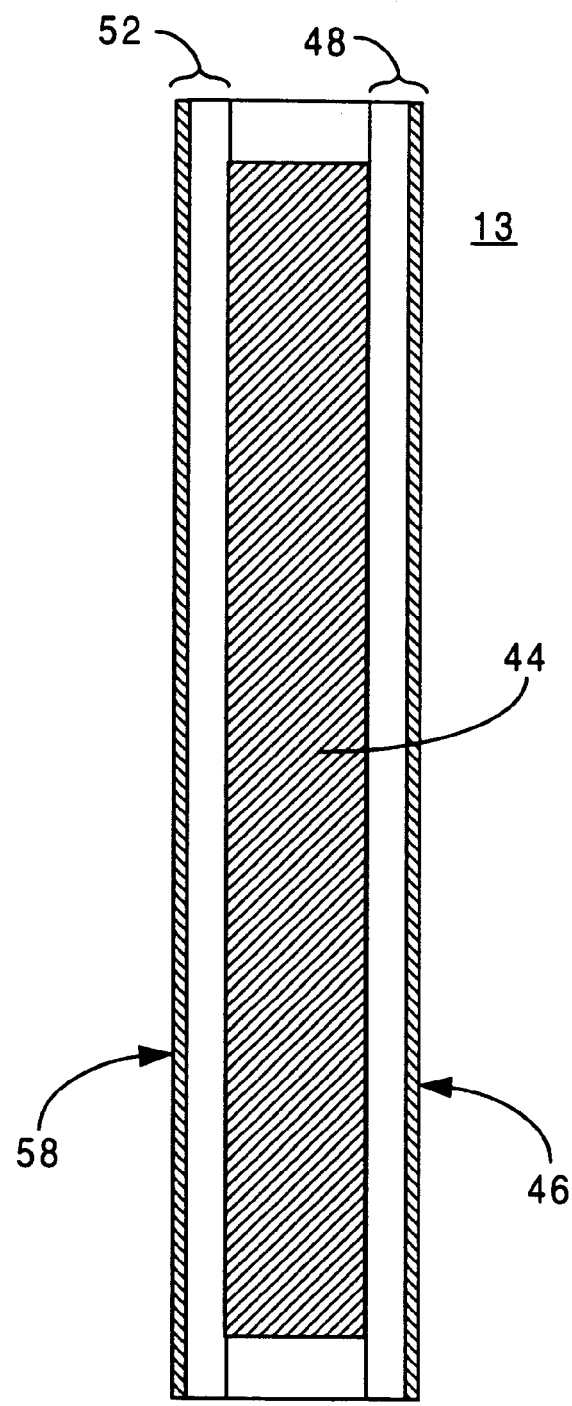
FIG. 3 is a schematic diagram of a prior art ferroelectric liquid crystal based shutter.

FIGS. 4A–21B are schematic diagrams showing various embodiments of a ferroelectric liquid crystal-based display device 15 according to the invention. The display device 15 can be incorporated into various types display applications, including miniature, wearable devices, cathode-ray tube replacements, and projection displays. Elements of the display device shown in FIGS. 4A–21B that are identical to elements of the prior art ferroelectric liquid crystal-based display devices 5 shown in FIG. 1A through FIG. 3 are indicated by the same reference numerals and will not be described again here.

Figure 4A:
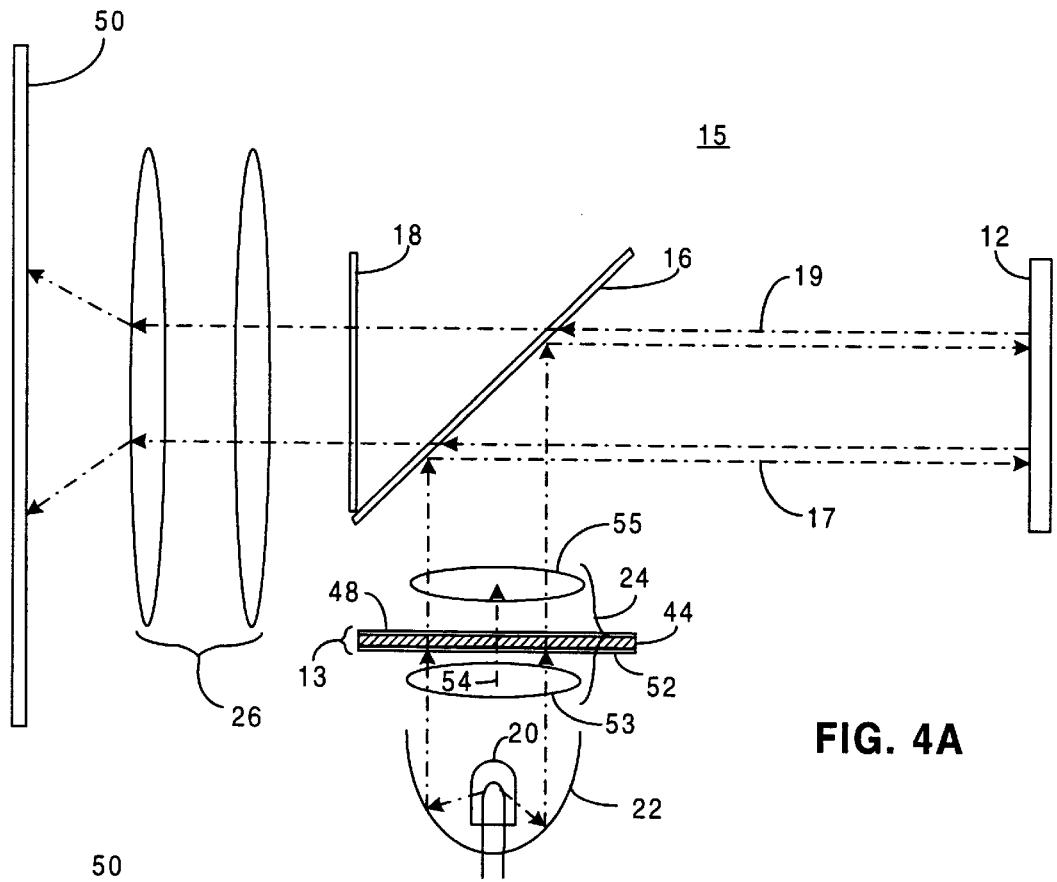
FIG. 4A is a schematic diagram of a display device according to the invention with a single reflective spatial light modulator, a beam splitter, and a shutter in the OPEN state located within the collector optics.
Figure 4B:
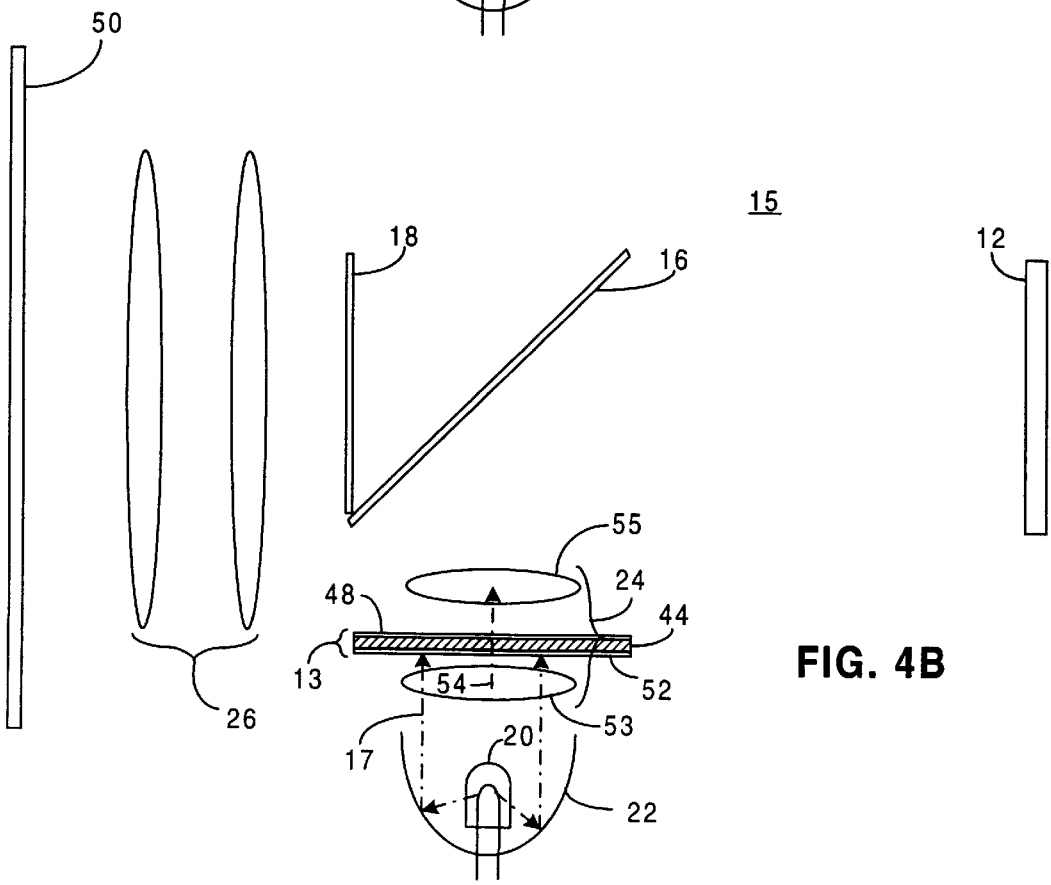
FIG. 4B is a schematic diagram of the display device depicted in FIG. 4A with the shutter in the CLOSED state.

Specifically, FIGS. 4A–4B depict a first embodiment of the ferroelectric display device according to the invention. The display device 15 includes many of the components of the prior art display devices 5 including a light source 20, a reflector 22, collector optics 24, a beam splitter 16, a reflective spatial light modulator that includes ferroelectric liquid crystal material, an analyzer 18, and imaging optics 26. The display device also includes a light output 50 which may include any location on which a real or virtual image is formed by the display device 15. Examples of light output 50 include, but are not limited to, a screen, an eyepiece, or the retina of an eye.

The light source 20 may include any of the numerous types of well known light sources including fast-acting sources such as LEDs, and slow-acting sources such as incandescent, flourescent, and arc lamps. The selection of a particular type of light source will depend, in large part, on the display application in which the display device will be used. Typically, projection display applications will require substantially brighter light sources such as arc lamps, while wearable displays applications can utilize less bright light sources such as LEDs or small incandescent bulbs.

In each of the FIGS. 4A–21B the path of the light generated by the light source is depicted by a broken line with arrowheads indicating the direction of travel. The portion of the path in which the light generated by the light source 20 travels towards the reflective spatial light modulator 12 (or first, second, and third spatial light modulators 60, 62, and 64 in FIGS. 10A–15B) is will be referred to as the illumination optical path 17. The portion of the path in which the light reflected from the spatial light modulator 12 (or first, second, and third spatial light modulators 60, 62, 64 in FIGS. 10A–15B) will be referred to as the output optical path 19. In each Figure, the light generated by the light source is shown reflecting off the reflector 22 before passing through the input lens the collector optics 24. It is not necessary, however, for the reflector or the collector optics to be present in all embodiments of the invention as light can travel directly from the light source towards the beam splitter 16, when present, or the spatial light modulator.

The beam splitter 16 preferably has orthogonal directions of maximum transmissivity and maximum reflectivity, although beam splitters which transmit approximately 50% and reflect approximately 50% of the light striking them from orthogonal directions will work. The beam splitter is also preferably located along both the illumination optical path 17 and the output optical path 19. The beam splitter is also located and aligned relative to the light source 20, the light output 50, and the spatial light modulator 12 (or first, second, and third spatial light modulators 60,62, and 64 in FIGS. 10A–15B) to either reflect or transmit the light generated by the light source towards the spatial light modulator, and either reflect or transmit towards the light output the light reflected by the spatial light modulator. While in the Figures. the beam splitter 16 is depicted reflecting light from the light source 20 towards the reflective spatial light modulator 12 (or first, second, and third spatial light modulators 60,62, and 64 in FIGS. 10A–15B)

and transmitting the light reflected from the spatial light modulator 12 towards the light output 50, the opposite could be true. For example, by swapping the position of the light source 20, reflector 22, and collector optics 24 with the position of the imaging optics 26 and light output 50 (not shown), the beam splitter would have opposite function. In the preceding example, the beam splitter 16 would transmit the light generated by the light source 20 towards the reflective spatial light modulator 12 and would reflect the light reflected by the reflective spatial light modulator 12 towards the light output 50. In each case, the beam splitter functions by reflecting light coming from one direction and by transmitting light coming from an orthogonal direction.

The display device 15 depicted in FIGS. 4A–4B has the shutter 13 located along the illumination optical path 17 between the light source 20 and the beam splitter 16. The shutter 13 has an OPEN state depicted in FIG. 4A and a CLOSED state depicted in FIG. 4B. The shutter 13 is located and aligned to transmit the light generated by the light source 20 along the illumination optical path 17 towards the beam splitter 16 in the OPEN position and to prevent transmission of the light generated by the light source 20 along the illumination optical path beyond the shutter 13 in the CLOSED state. While the shutter could be any one of the mechanical or electronic types of shutter known in the art, it is preferred that the shutter be of a type that includes ferroelectric liquid crystal material 44, and an input polarizing layer (not shown) included with the input transparent electrode 52 located between the ferroelectric liquid crystal material 44 and the light source 20. The use of ferroelectric liquid crystal material in the shutter has the advantage that it transitions from an OPEN state to a CLOSED state with roughly the same speed as the reflective spatial light modulator switched from an illumination mode to a balance mode and can be controlled with similar (or the same) switching controllers.

Placing the shutter 13 along the illumination optical path 17 between the light source 20 and the beam splitter 16 offers a number of advantages. First, the light generated by the light source will be transmitted by the shutter in the OPEN position only once. If the shutter 13 were located between the beam splitter 16 and the spatial light modulator 12, the shutter would necessarily transmit the light generated by the light source 20 twice, once along the illumination optical path 17, and once along the output optical path 19. If the shutter transmits the light twice, any optical imperfections in the shutter will only be introduced twice, doubling the number of possible introduced imperfections. Another advantage of placing the shutter between the light source 20 and the beam splitter 16 is that any optical imperfections that are introduced by the shutter 13 are introduced before the spatial light modulator 12 reflects a pixellated image. Thus the pixellated image itself will not have errors introduced into it by transmission through a shutter.

Another advantage of placing a ferroelectric liquid crystal based shutter between the light source and the beam splitter is that no individual polarizer 14 is required since a ferroelectric liquid crystal-based shutter includes polarizing layers 46, 58 as previously described. Thus, the light transmitted by the shutter in the OPEN state is necessarily polarized and the independent polarizer 14 of the prior art display device 5 can be eliminated. Alternatively, the independent polarizer 14 can be retained and a less expensive output transparent electrode 52 that does not contain an output polarizing layer 58 can be substituted for the output transparent electrode depicted that includes the output polarizing layer 58. In such as case, the independent polarizer 14 would effectively act as part of the shutter by preventing transmission of light towards beam splitter when the shutter is in the CLOSED position.

Specifically, the shutter 13 depicted in FIGS. 4A and 4B is located along an collector optical path 54 connecting the input lens 53 of the collector 24 to the output lens 55 of the collector. In this position, the shutter can be somewhat protected from the heat generated by the light source by the input lens 53 while the output lens 55 can reduce or mask some of the optical imperfections introduced by the shutter as it collects all the light transmitted by the shutter and concentrates it towards the beam splitter 16.

In FIG. 4A, the shutter is in an OPEN state corresponding to the illumination period for the reflective spatial light modulator 12. The light generated by the light source 20 begins traveling through the display device 15 towards the light output 50 by traveling along the illumination optical path 17 towards the reflector 22 where it is reflected towards the input lens 53 of the collector optics 24. The light is transmitted through the input lens 53 of the collector and is given a first direction of polarization when it is transmitted through the input polarizing layer (not shown) of the input transparent electrode 52 of the shutter 13. The polarized light then travels through the ferroelectric liquid crystal material 44 where the direction of polarization of the light either remains constant or is rotated through 90° depending on the direction of the electric field between the input transparent electrode 52 and the output transparent electrode 48. If the direction of polarization remains constant, the output transparent electrode 48 must have an output polarization layer (not shown this Figure) with a direction of polarization parallel to the direction of polarization of the input polarization layer (not shown this Figure) for the shutter to transmit light towards the beam splitter (the OPEN state). Alternatively, if the direction of polarization is rotated, the output transparent electrode 48 must have an output polarization layer with a direction of polarization orthogonal to the direction of polarization of the input polarization layer for the shutter to transmit light towards the beam splitter (the OPEN state).

Once the light generated by the light source 20 is transmitted by the output transparent electrode 48 of the shutter 13, it is concentrated and transmitted by the output lens 55 of the collector optics 24 towards the beam splitter 16. The light is then reflected by the beam splitter towards the reflective spatial light modulator 12 where a pixellated image is formed and reflected back towards the beam splitter 16. The light reflected by the reflective spatial light modulator is then transmitted by the beam splitter 16 towards the analyzer 18 which blocks pixels having one direction of polarization and transmits pixels to the imaging optics 26 that have an orthogonal direction of polarization. The light is then transmitted by the imaging optics 26 toward the light output 50 where an image is displayed.

If a shutter (mechanical or otherwise) not including at least one polarizing layer is used in place of the preferred ferroelectric liquid crystal-based shutter 13 depicted, the polarizer 14 discussed previously must be included in the display device 15.

In FIG. 4B, the shutter is in a CLOSED state corresponding to the balance period for the reflective spatial light modulator 12. The light generated by the light source 20 begins traveling along the illumination optical path 17 through the display device 15 by traveling towards the reflector 22 where it is reflected towards the input lens 53 of the collector optics 24. The light is transmitted through the input lens 53 of the collector and is given a first direction of polarization when it is transmitted through the input polarizing layer (not shown this Figure) of the input transparent electrode 52 of the shutter 13. The polarized light then travels through the ferroelectric liquid crystal material 44 where the direction of polarization of the light either remains constant or is rotated through 90° depending on the direction of the electric field between the input transparent electrode 52 electrode and the output transparent electrode 48. If the direction of polarization remains constant, the output transparent electrode 48 must have an output polarization layer (not shown this Figure) with a direction of polarization orthogonal to the direction of polarization of the input polarization layer (not shown this Figure) for the shutter to prevent the transmission of light along the illumination optical path 17 beyond the shutter (the CLOSED state). Alternatively, if the direction of polarization is rotated, the output transparent electrode 48 must have an output polarization layer with a direction of polarization parallel to the direction of polarization of the input polarization layer for the shutter to prevent transmission of light along the illumination optical path 17 towards the beam splitter 16 (the CLOSED state).

Figure 5A:
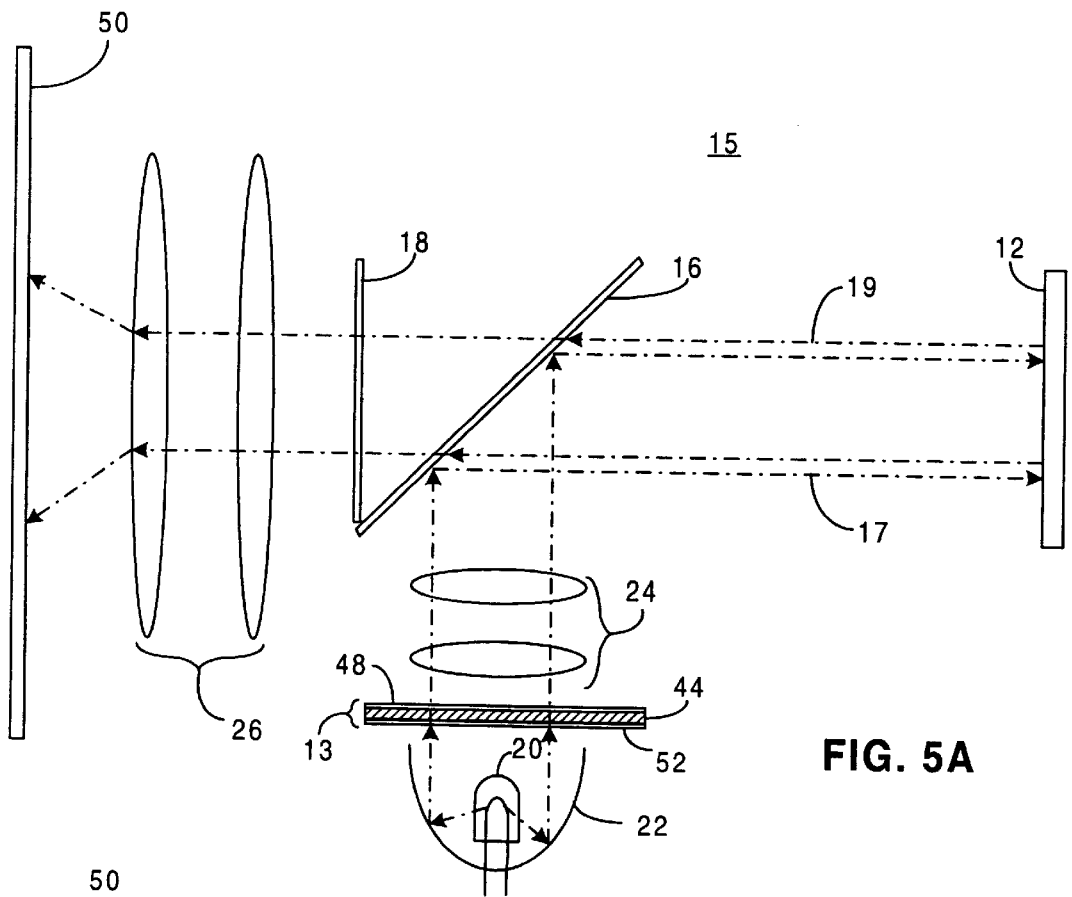
FIG. 5A is a schematic diagram of a display device according to the invention with a single reflective spatial light modulator, a beam splitter, and a shutter in the OPEN state located between the collector optics and the light source.
Figure 5B:
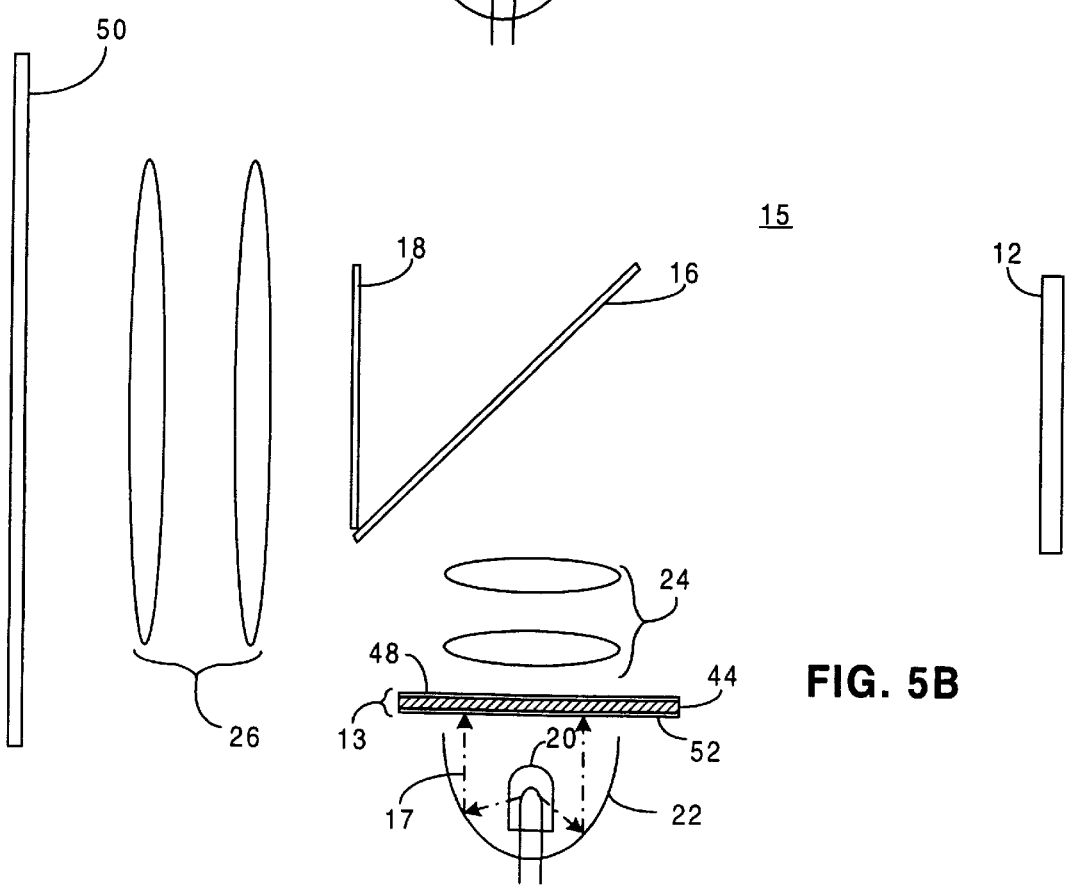
FIG. 5B is a schematic diagram of the display device depicted in FIG. 5A with the shutter in the CLOSED state.

FIGS. 5A–5B depict a display device 15 according to the invention with a shutter in an OPEN and CLOSED state, respectively. The depicted display device is similar to the display device depicted in FIGS. 4A–4B except that the shutter 13 is located and aligned between the light source and the collector optics 24 rather than between the lenses of the collector optics 24. The operation of the display device 15 depicted is essentially as previously described, except that when the shutter is in its CLOSED state shown in FIG. 5B, the light is prevented from transmitting towards both the collector optics and the beam splitter.

Figure 6A:
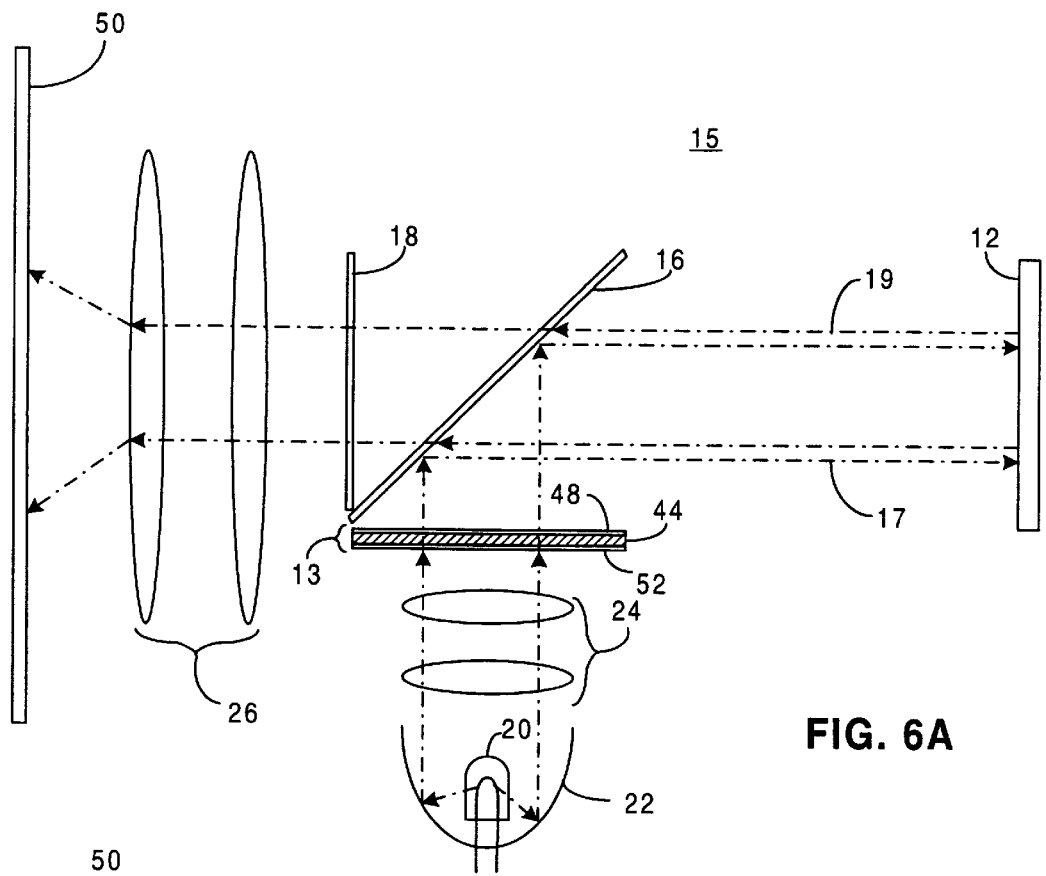
FIG. 6A is a schematic diagram of a display device according to the invention with a single reflective spatial light modulator, a beam splitter, and a shutter in the OPEN state located between the collector optics and the beam splitter.
Figure 6B:
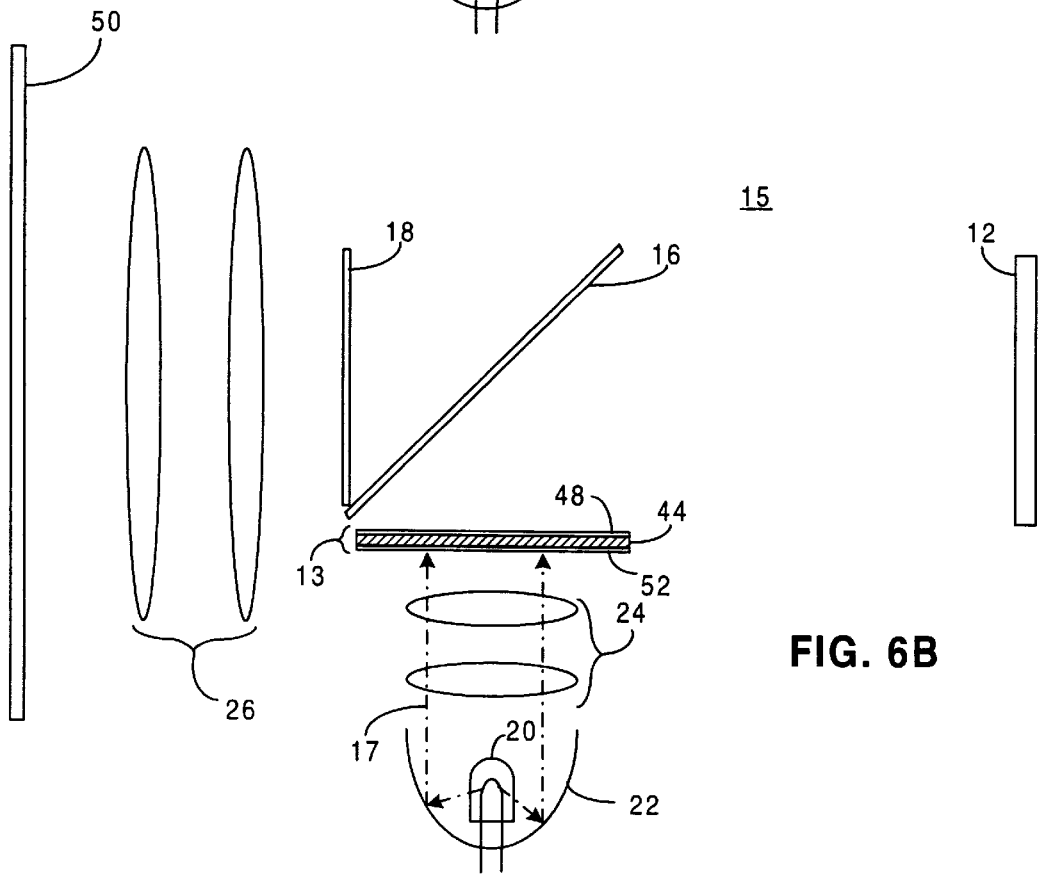
FIG. 6B is a schematic diagram of the display device depicted in FIG. 6A with the shutter in the CLOSED state.

FIGS. 6A–6B depict a display device 15 according to the invention with a shutter in the OPEN and CLOSED state, respectively. The depicted display device is similar to the display devices depicted in FIGS. 4A–4B and FIGS. 5A–5B except that the position of the shutter 13 has been shifted so that it is located and aligned between the collector optics 24 and the beam splitter 16. The operation of the depicted display device is essentially as previously described, except that light will continue to be transmitted by the collector optics when the shutter is in both the OPEN and CLOSED states. One possible advantage of this arrangement is that the shutter may be mounted in the same location when the independent polarizer 14 had been mounted saving the expense of designing a fixture (not shown) for the shutter.

Figure 7A:
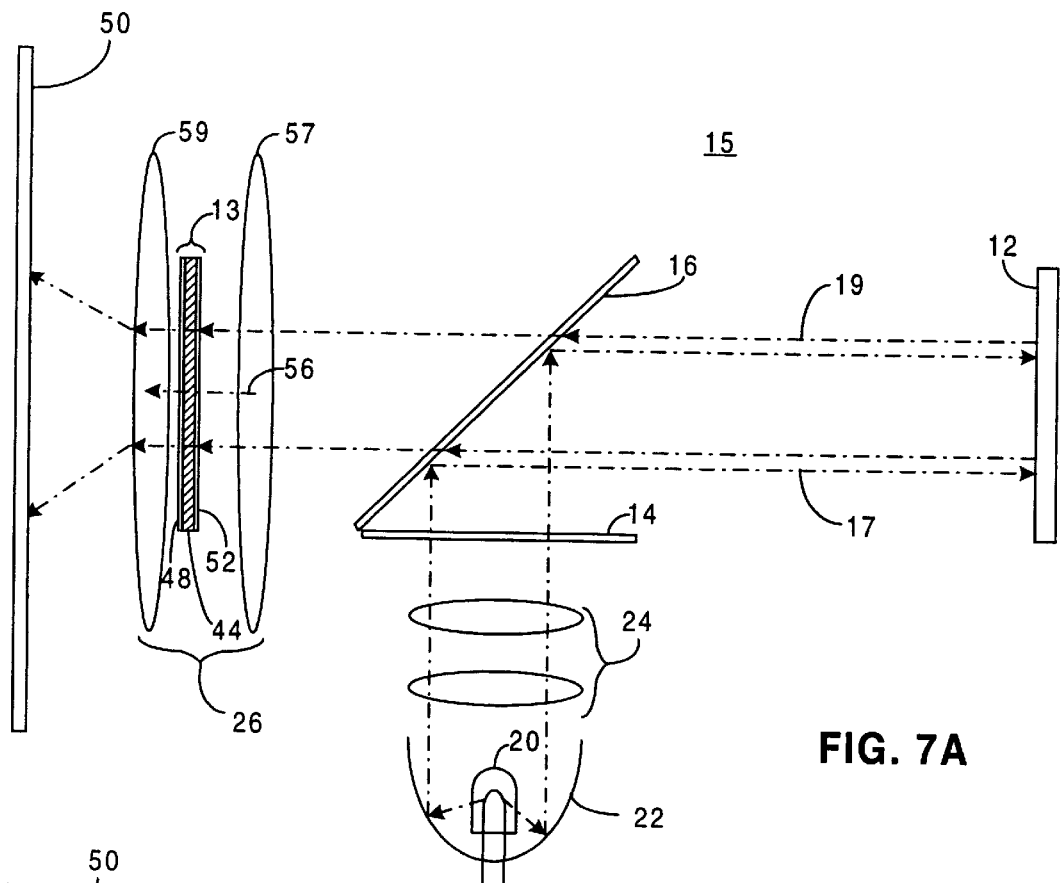
FIG. 7A is a schematic diagram of a display device according to the invention with a single reflective spatial light modulator, a beam splitter, and a shutter in the OPEN state located within the imaging optics.
Figure 7B:
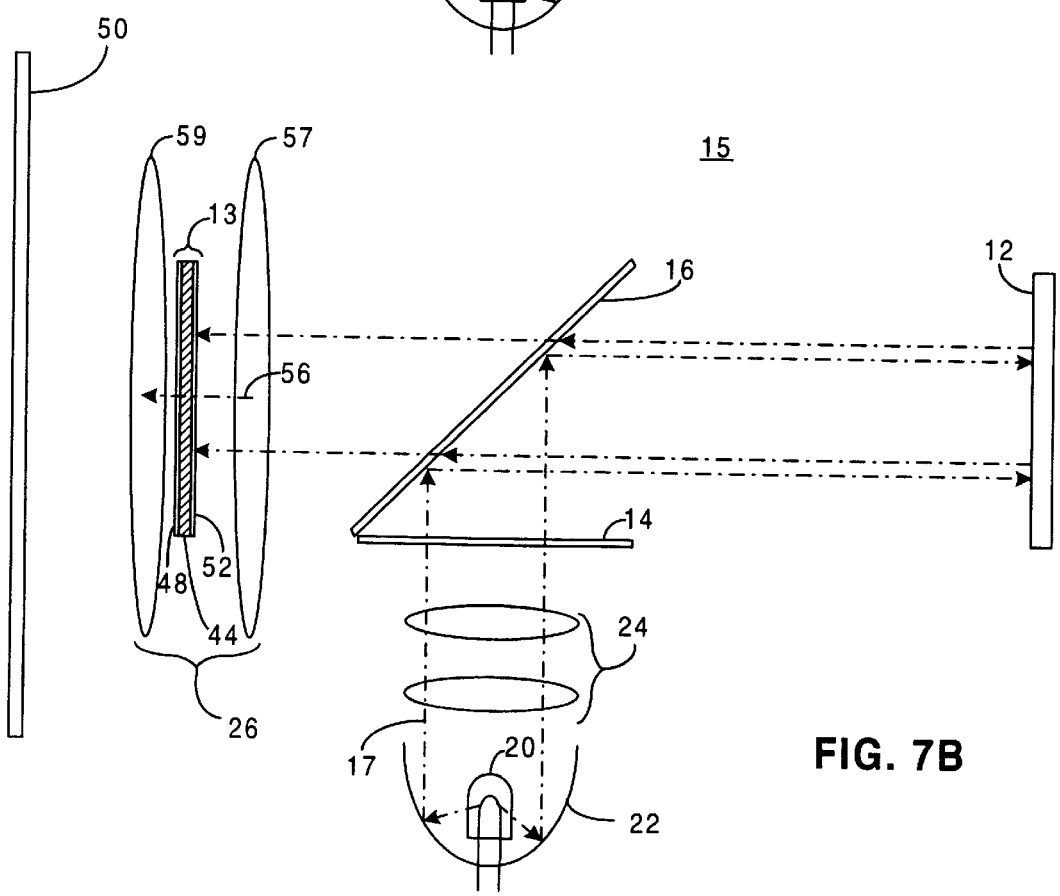
FIG. 7B is a schematic diagram of the display device depicted in FIG. 7A with the shutter in the CLOSED state.

FIGS. 7A–7B depict a display device 15 according to the invention with a shutter in the OPEN and CLOSED state, respectively. The depicted display device is similar to the previously described display devices except that the shutter 13 is located along the output optical path 19 between the beam splitter 16 and the light output 50 rather than along the illumination optical path 17 between the light source 20 and the beam splitter. Specifically the shutter 13 is located within the imaging optics 26, along an imaging optical path 56 connecting an input imaging lens 57, which faces the beam splitter 16 and an output imaging lens 59, which faces the light output 50.

In FIG. 7A, the shutter is in an OPEN state corresponding to the illumination period for the reflective spatial light modulator 12. The light generated by the light source 20 begins traveling through the display device 15 towards the light output 50 by traveling along the illumination optical path 17 towards the reflector 22 where it is reflected towards the collector optics 24. The light is transmitted through the collector optics where it is concentrated towards the beam splitter 16. Before arriving at the beam splitter, however, the light is given a first direction of polarization as it is transmitted through the polarizer 14. The polarized light is then transmitted to the beam splitter 16. The light is then reflected by the beam splitter towards the reflective spatial light modulator 12 where a pixellated image is formed and reflected back towards the beam splitter 16 along the output optical path 19. The light reflected by the reflective spatial light modulator is then transmitted the beam splitter 16 towards the imaging optics 26.

The light reflected by the spatial light modulator 12 is then transmitted by the input imaging lens 57 towards the input transparent electrode 52 of the shutter 13. The input polarization layer (not shown) of the input transparent electrode operates as the analyzer 18 had in the previously described embodiments, absorbing the reflected light from pixels that imparted a first direction of polarization while transmitting the reflected light from pixels which imparted a direction of polarization orthogonal to the first direction. The light which is transmitted through the input transparent electrode 52 is then transmitted through the ferroelectric liquid crystal material 44 where the direction of polarization of the pixels either remains constant or is rotated through 90° depending on the direction of the electric field between the input transparent electrode 52 and the output transparent electrode 48. If the direction of polarization remains constant, the output polarizing layer (not shown) of the output transparent electrode 48 must have a direction of polarization parallel to the direction of polarization of the input polarizing layer (not shown) of the input transparent electrode 52 for the shutter to transmit the pixels towards the output imaging lens 59 and the light output 50 (the OPEN state). Alternatively, if the direction of polarization is rotated, the output polarizing layer (not shown) of the output transparent electrode 48 must have a direction of polarization orthogonal to the direction of polarization of the input polarizing layer (not shown) of the input transparent electrode 52 for the shutter to transmit the pixels towards the output imaging lens 59 and the light output 50 (the OPEN state). The transmitted pixels then are transmitted by the output imaging lens 59 towards the light output 50 where an image is displayed.

If a shutter (mechanical or otherwise) without at least one polarizing layer is used in placed of the ferroelectric liquid crystal based shutter 13 depicted, the analyzer 18 discussed previously must be included in the display device 15.

In FIG. 7B, the shutter is in a CLOSED state corresponding to the balance period for the reflective spatial light modulator 12. The light generated by the light source 20 travels along the illumination optical path 17 and the output optical path 19 through the display device 15 as described above until it reaches the shutter 13. At the shutter, the pixels transmitted by input transparent electrode 52 transmit through the ferroelectric liquid crystal material 44 where the direction of polarization of the pixels either remains constant or is rotated through 90° depending on the direction of the electric field between the input transparent electrode 52 and the output transparent electrode 48. If the direction of polarization remains constant, the output transparent electrode 48 must have an output polarization layer (not shown this Figure) with a direction of polarization orthogonal to the direction of polarization of the input polarization layer (not shown this Figure) for the shutter to prevent the transmission of light along the output optical path 19 beyond the shutter (the CLOSED state). Alternatively, if the direction of polarization is rotated, the output transparent electrode 48 must have an output polarization layer with a direction of polarization parallel to the direction of polarization of the input polarization layer for the shutter to prevent transmission of light along the output optical path 19 towards the light output 50 (the CLOSED state).

Placing the shutter 13 between the light output 50 and the beam splitter 16 offers the advantages that the light generated by the light source will be transmitted by the shutter in the OPEN position only once. As previously discussed, this will cut in half the number of possible imperfections introduced by the shutter if the shutter is between the beam splitter 16 and the spatial light modulator 12. In addition, the use of a ferroelectric liquid crystal-based shutter 13 between the light output 50 and the beam splitter eliminates the need for an independent analyzer 18 as previously discussed. Alternatively, the independent analyzer may be retained and a less expensive input transparent electrode 52 without the input polarization layer may be used.

Figure 8A:
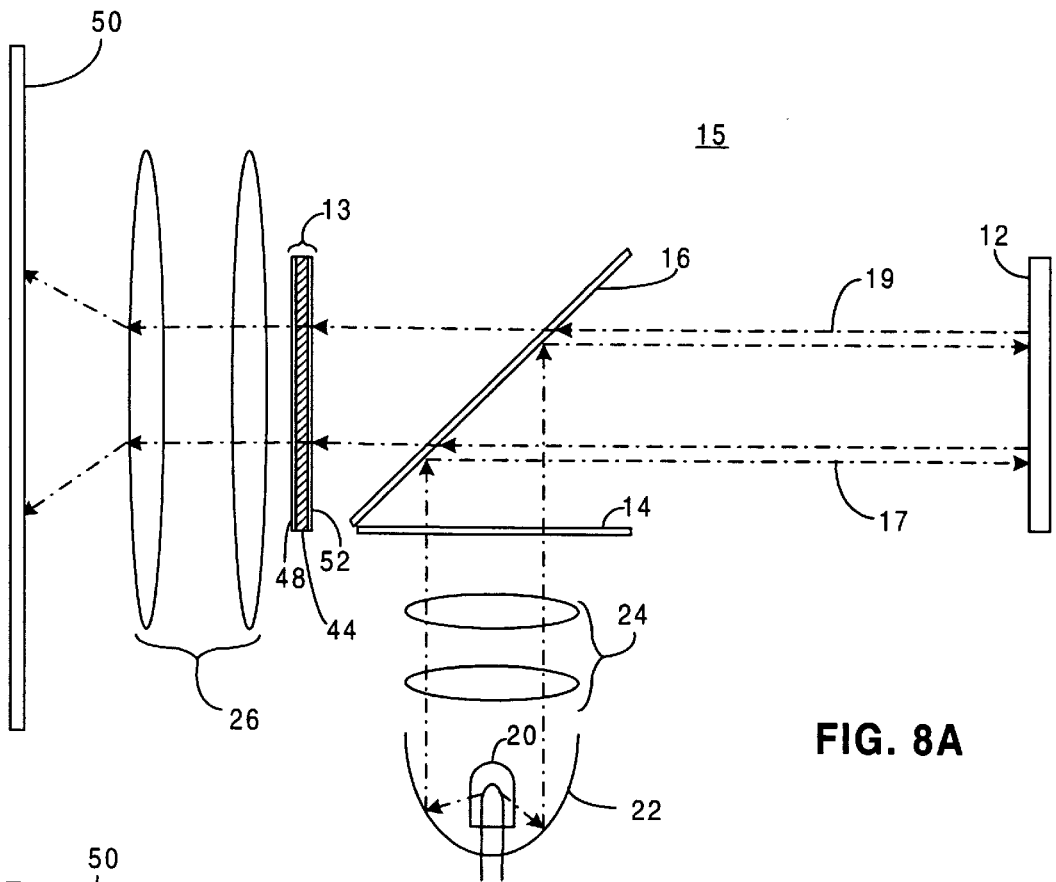
FIG. 8A is a schematic diagram of a display device according to the invention with a single reflective spatial light modulator, a beam splitter, and a shutter in the OPEN state located between the imaging optics and the beam splitter.
Figure 8B:
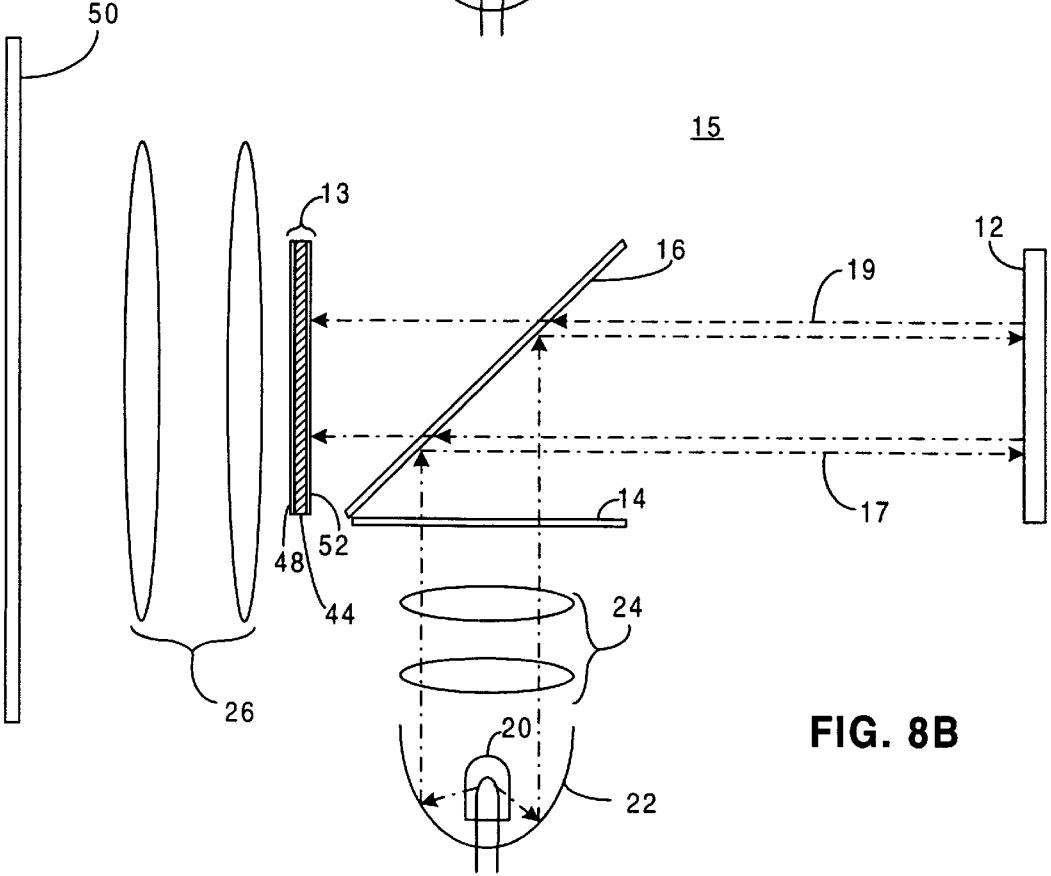
FIG. 8B is a schematic diagram of the display device depicted in FIG. 8A with the shutter in the CLOSED state.

FIGS. 8A–8B depict a display device 15 according to the invention with a shutter in an OPEN and CLOSED state, respectively. The depicted display device is similar to the display device depicted in FIGS. 7A–7B except that the shutter 13 is located and aligned between the beam splitter 16 and the imaging optics 26 rather than between the lenses of the imaging optics 26. The operation of the display device 15 depicted is essentially as previously described, except that when the shutter is in its CLOSED state shown in FIG. 8B, the pixels are prevented from transmitting towards both the imaging optics and the light output 50.

Figure 9A:
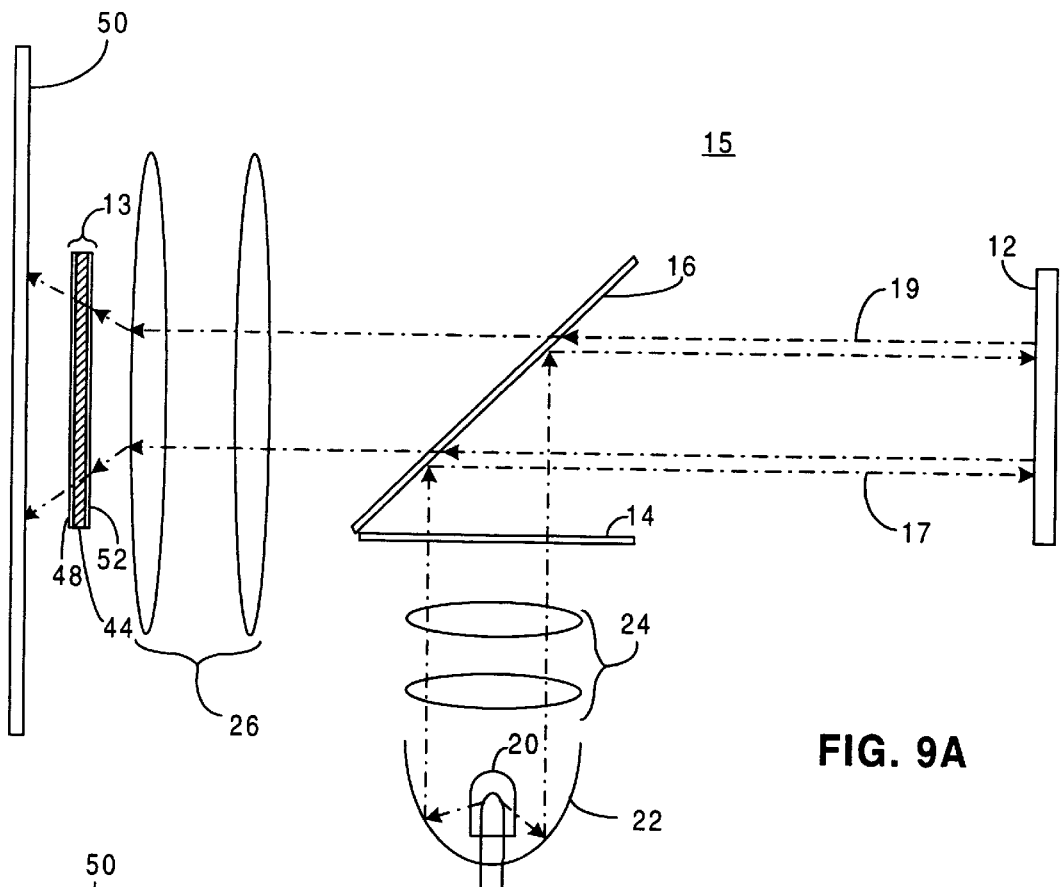
FIG. 9A is a schematic diagram of a display device according to the invention with a single reflective spatial light modulator, a beam splitter, and a shutter in the OPEN state located between the imaging optics and the light output.
Figure 9B:
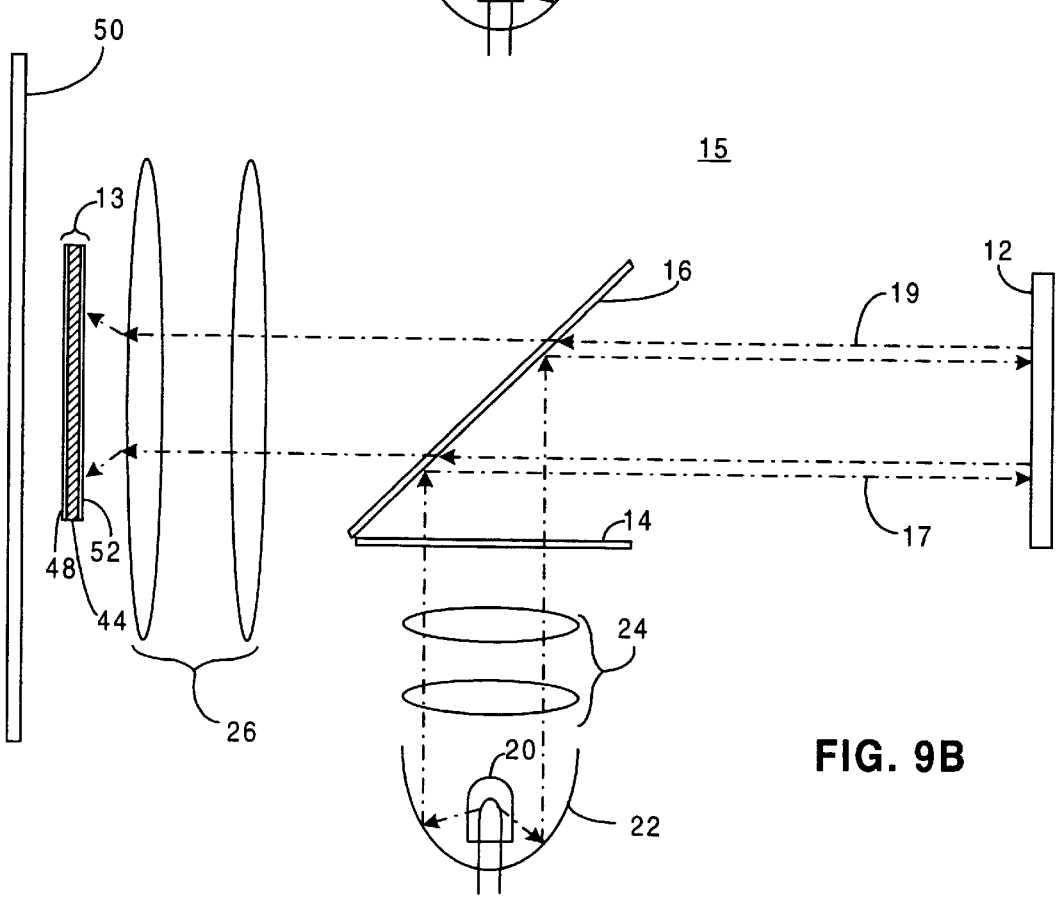
FIG. 9B is a schematic diagram of the display device depicted in FIG. 9A with the shutter in the CLOSED state.

FIGS. 9A–9B depict a display device 15 according to the invention with a shutter in an OPEN and CLOSED state, respectively. The depicted display device is similar to the display device depicted in FIGS. 7A–7B except that the shutter 13 is located and aligned between the light output 50 and the imaging optics 26 rather than between the lenses of the imaging optics 26. The operation of the display device 15 depicted is essentially as previously described, except that when the shutter is in its CLOSED state shown in FIG. 9B, the pixels are still transmitted by the imaging optics 26.

Figure 10A:
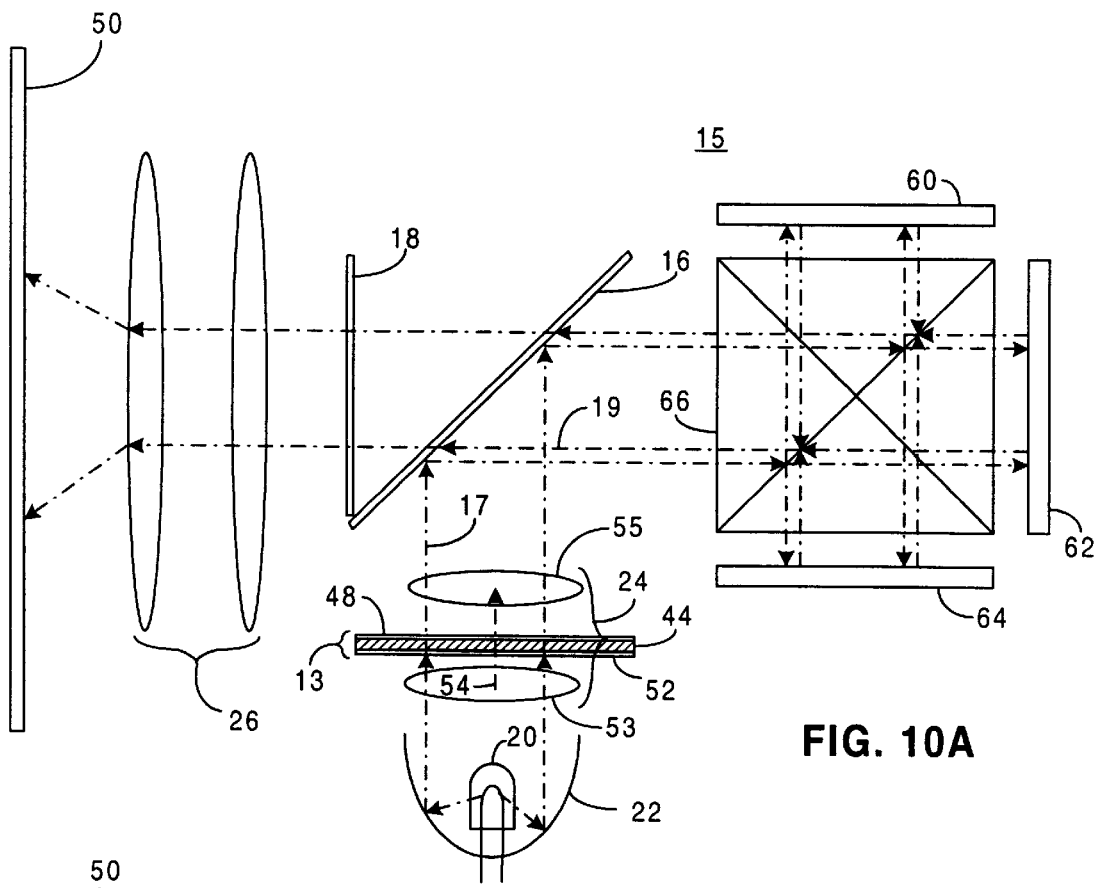
FIG. 10A is a schematic diagram of a display device according to the invention with three reflective spatial light modulators, a beam splitter, and a shutter in the OPEN state located within the collector optics.
Figure 10B:
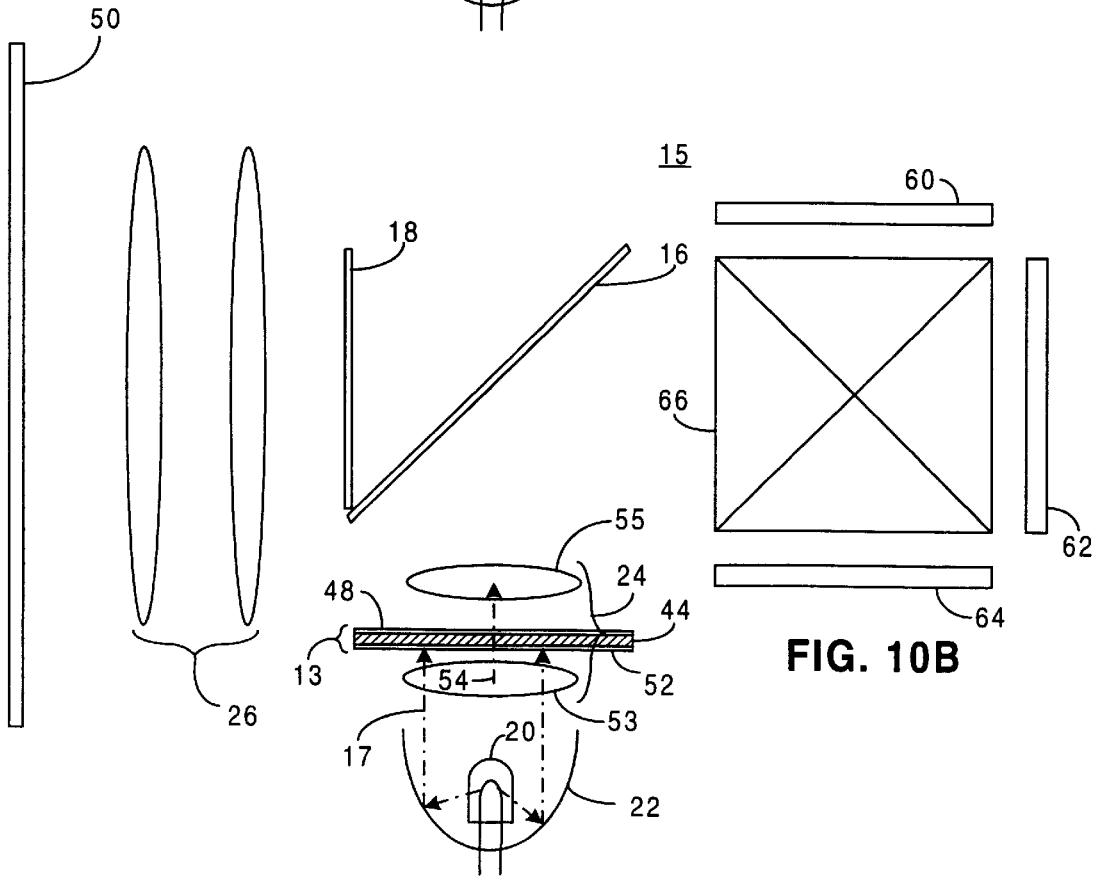
FIG. 10B is a schematic diagram of the display device depicted in FIG. 10A with the shutter in the CLOSED state.

FIGS. 10A–10B depict a display device 15 according to the invention with a shutter in an OPEN and CLOSED state, respectively. The depicted display device has a similar shutter 13 position and function as the display device depicted in FIGS. 4A–4B and previously described. The most significant difference between the embodiment depicted in FIGS. 10A–10B from the previously described embodiments of the invention is the use of a color separator 66 with a first, second, and third reflective spatial light modulators 60, 62, and 64 in place of the single reflective spatial light modulator 12. Color separators are known in the art, and include the dichroic plates depicted in FIG. 2, the Philips cube (not shown), and the color separation cube depicted in FIGS. 10A–10B.

The use of three reflective spatial light modulators and a color separator allows a color image to be displayed at the light output 50 using a "white" light source 20. The color separator 66 is used to separate three color bands, also known as wavelength bands, from the "white" light generated by the light source 20 and to direct one of the color bands to each of the three modulators 60, 62, 64. Typically, the three colors that are used are red, blue, and green. By creating three separate, individually colored, pixellated images and recombining them, a full color image can be created.

In addition to the previously discussed advantages of using a single shutter 13 located between the light source 20 and the beam splitter 16, using a single shutter in a display device 15 that includes three reflective spatial light modulators 60, 62, 64 eliminates the need for an individual shutter for each reflective spatial light modulator. This use of a single shutter instead of three reduces the cost of the display device and simplifies the overall design of the display device.

In FIG. 10A, the shutter is in an OPEN state corresponding to the illumination period for first, second, and third reflective spatial light modulators 60, 62, 64. The light generated by the light source 20 begins traveling through the display device 15 towards the light output 50 by traveling along the illumination optical path 17 towards the reflector 22 where it is reflected towards the input lens 53 of the collector optics 24. The light is transmitted through the input lens 53 of the collector and is given a first direction of polarization when it is transmitted through the input polarizing layer (not shown) of the input transparent electrode 52 of the shutter 13. The polarized light then travels through the ferroelectric liquid crystal material 44 where the direction of polarization of the light either remains constant or is rotated through 90° depending on the direction of the electric field between the input transparent electrode 52 and the output transparent electrode 48. If the direction of polarization remains constant, the output transparent electrode 48 must have an output polarization layer (not shown this Figure) with a direction of polarization parallel to the direction of polarization of the input polarization layer (not shown this Figure) for the shutter to transmit light towards the beam splitter (the OPEN state). Alternatively, if the direction of polarization is rotated, the output transparent electrode 48 must have an output polarization layer with a direction of polarization orthogonal to the direction of polarization of the input polarization layer for the shutter to transmit light towards the beam splitter (the OPEN state).

Once the light generated by the light source 20 is transmitted by the output transparent electrode 48 of the shutter 13, it is concentrated and transmitted by the output lens 55 of the collector optics 24 towards the beam splitter 16. The light is then reflected by the beam splitter towards the color separator 66 which separates three distinct wavelength bands from the light generated by the light source. The color separator then reflects or transmits the first, second, and third wavelength band towards the first, second, and third reflective spatial light modulators 60, 62, 64, respectively, each of which forms a pixellated image which is reflected back towards the color separator 66 along the output optical path 19. The three reflected pixellated imaged are recombined by the color separator 66 and reflected or transmitted back towards the beam splitter 16. The combined pixellated image is then transmitted by the beam splitter 16 towards the analyzer 18 which blocks pixels having one direction of polarization and transmits pixels to the imaging optics 26 that have an orthogonal direction of polarization. The combined pixellated image is then transmitted by the imaging optics 26 toward the light output 50 where a full color image is displayed.

In FIG. 10B, the shutter is in a CLOSED state corresponding to the balance period for the first, second, and third reflective spatial light modulators 60, 62, 64. The light generated by the light source 20 begins traveling along the illumination optical path 17 through the display device 15 by traveling towards the reflector 22 where it is reflected towards the input lens 53 of the collector optics 24. The light is transmitted through the input lens 53 of the collector and is given a first direction of polarization when it is transmitted through the input polarizing layer (not shown this Figure) of the input transparent electrode 52 of the shutter 13. The polarized light then travels through the ferroelectric liquid crystal material 44 where the direction of polarization of the light either remains constant or is rotated through 90° depending on the direction of the electric field between the input transparent electrode 52 electrode and the output transparent electrode 48. If the direction of polarization remains constant, the output transparent electrode 48 must have an output polarization layer (not shown this Figure) with a direction of polarization orthogonal to the direction of polarization of the input polarization layer (not shown this Figure) for the shutter to prevent the transmission of light along the illumination optical path 17 beyond the shutter (the CLOSED state). Alternatively, if the direction of polarization is rotated, the output transparent electrode 48 must have an output polarization layer with a direction of polarization parallel to the direction of polarization of the input polarization layer for the shutter to prevent transmission of light along the illumination optical path 17 towards the beam splitter 16 (the CLOSED state).

Figure 11A:
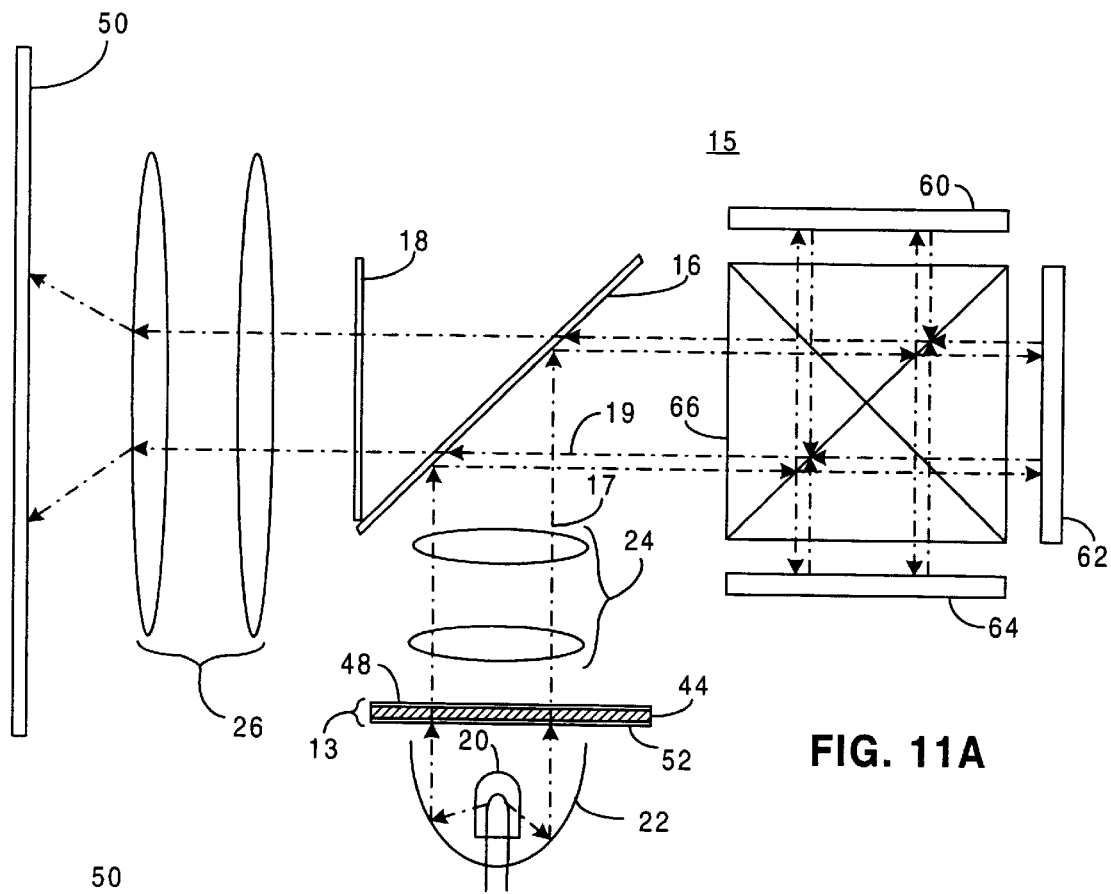
FIG. 11A is a schematic diagram of a display device according to the invention with three reflective spatial light modulators, a beam splitter, and a shutter in the OPEN state located between the collector optics and the light source.
Figure 11B:
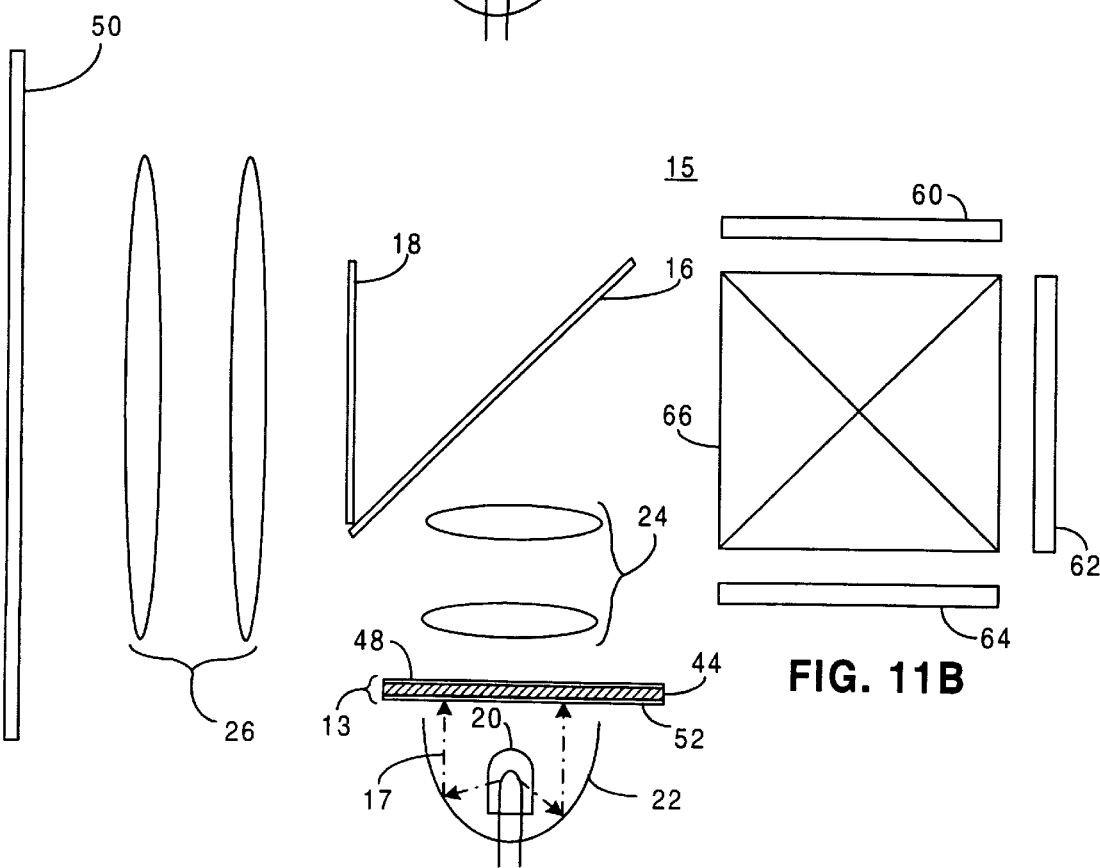
FIG. 11B is a schematic diagram of the display device depicted in FIG. 11A with the shutter in the CLOSED state.

FIGS. 11A–11B depict a display device 15 according to the invention with a shutter in an OPEN and CLOSED state, respectively. The depicted display device is similar to the display device depicted in FIGS. 10A–10B except that the shutter 13 is located and aligned between the light source and the collector optics 24 rather than between the lenses of the collector optics 24. The operation of the display device 15 depicted is essentially as previously described, except that when the shutter is in its CLOSED state shown in FIG. 11B, the light is prevented from transmitting towards both the collector optics and the beam splitter.

Figure 12A:
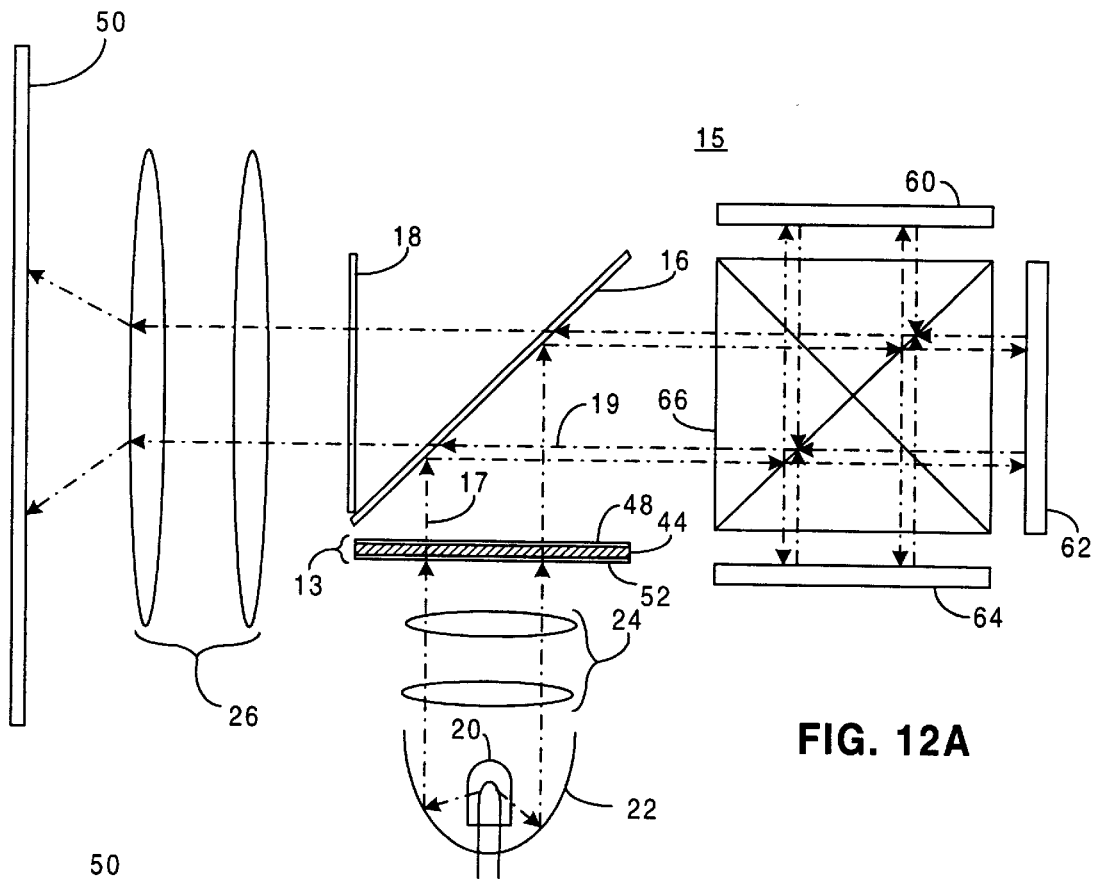
FIG. 12A is a schematic diagram of a display device according to the invention with three reflective spatial light modulators, a beam splitter, and a shutter in the OPEN state located between the collector optics and the beam splitter.
Figure 12B:
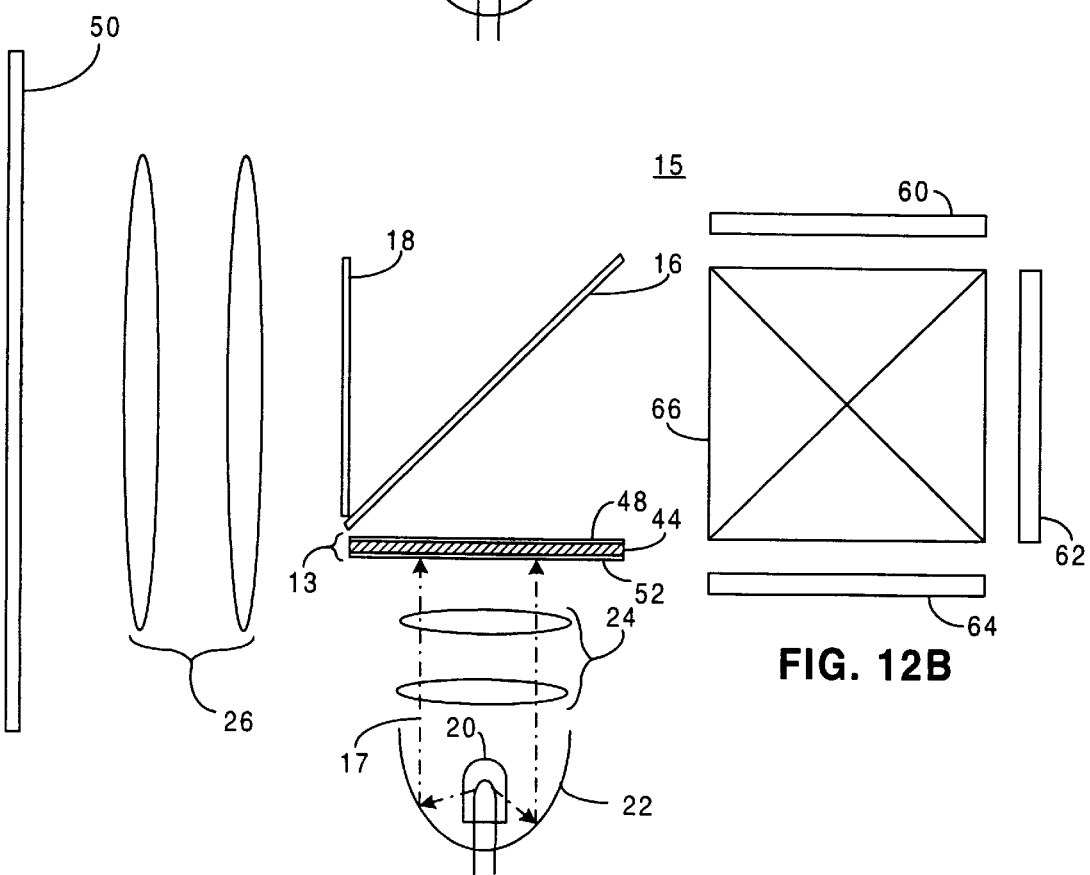
FIG. 12B is a schematic diagram of the display device depicted in FIG. 12A with the shutter in the CLOSED state.

FIGS. 12A–12B depict a display device 15 according to the invention with a shutter in the OPEN and CLOSED state, respectively. The depicted display device is similar to the display devices depicted in FIGS. 10A–10B and FIGS. 11A–11B except that the position of the shutter 13 has been shifted so that it is located and aligned between the collector optics 24 and the beam splitter 16. The operation of the depicted display device is essentially as previously described for display devices with three reflective spatial light modulators, except that light will continue to be transmitted by the collector optics when the shutter is in both the OPEN and CLOSED states. One possible advantage of this arrangement is that the shutter may be mounted in the same location when the independent polarizer 14 had been mounted saving the expense of designing a fixture (not shown) for the shutter.

Figure 13A:
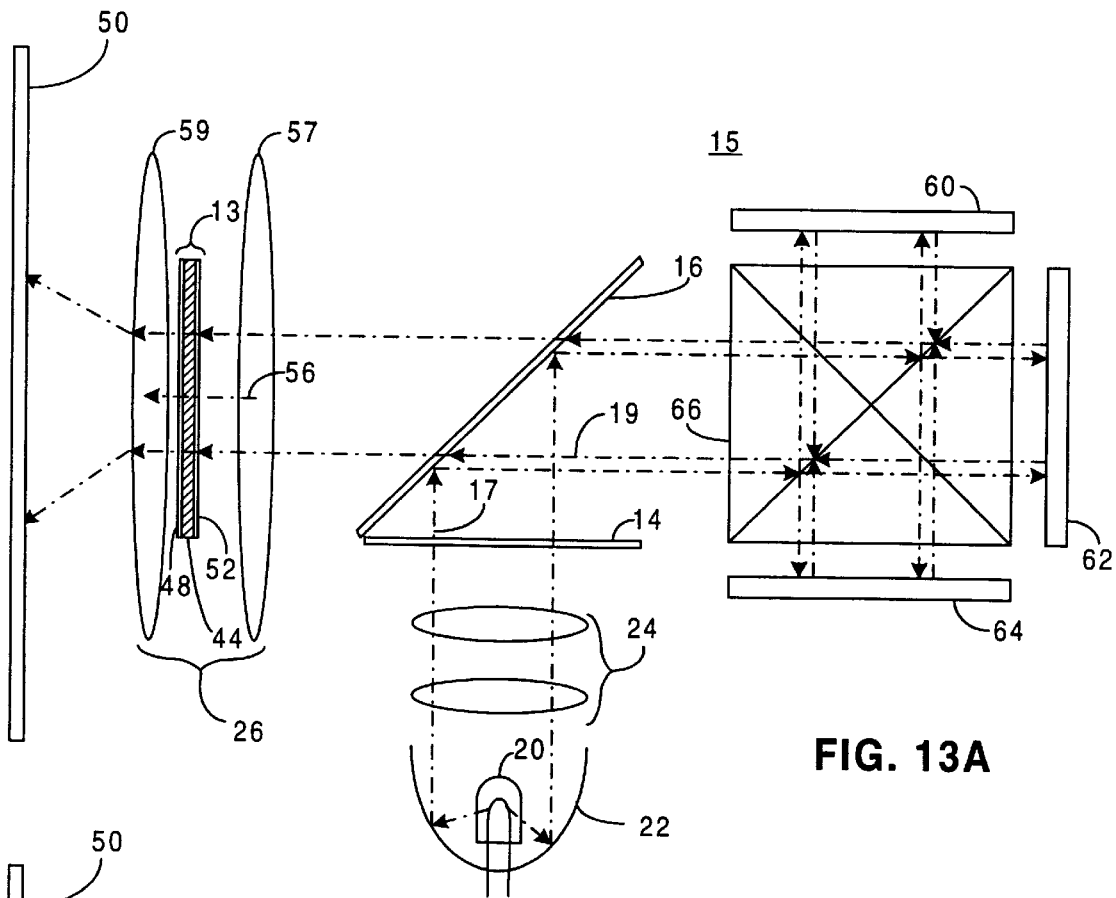
FIG. 13A is a schematic diagram of a display device according to the invention with three reflective spatial light modulators, a beam splitter, and a shutter in the OPEN state located within the imaging optics.
Figure 13B:
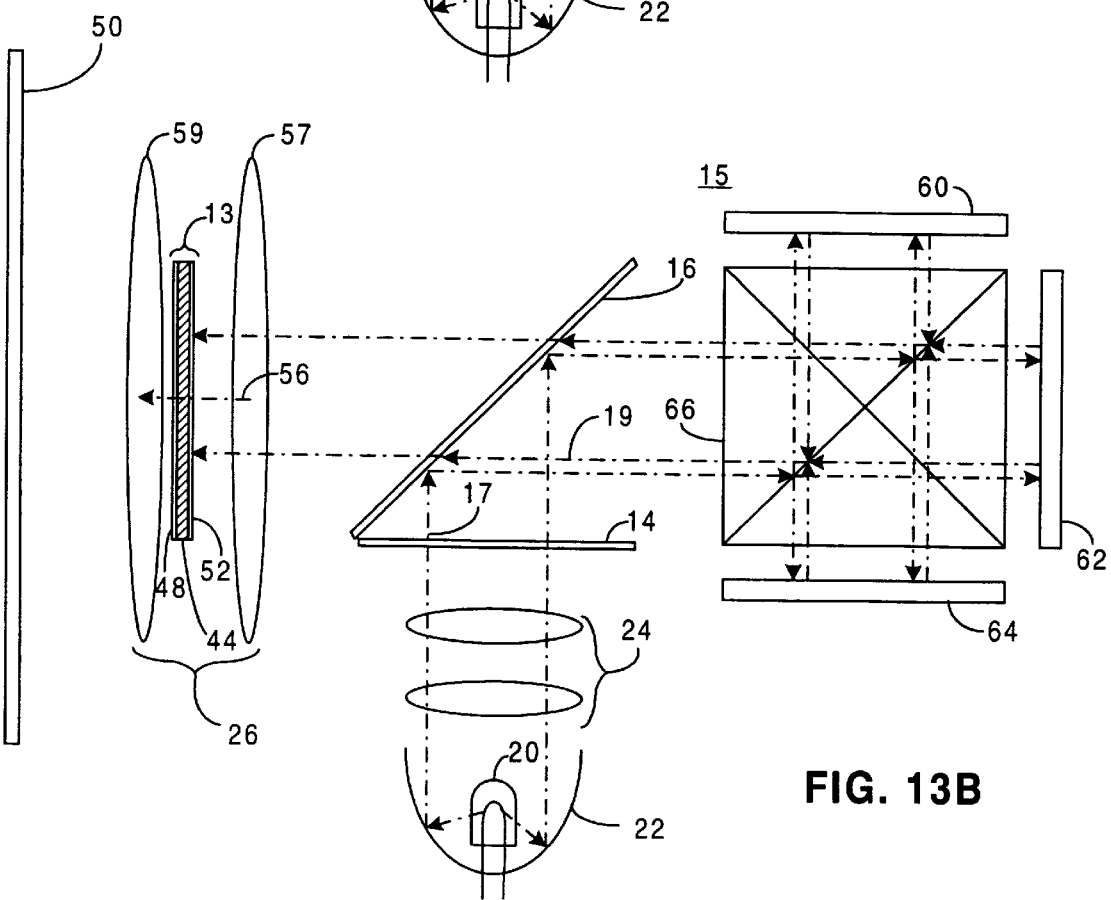
FIG. 13B is a schematic diagram of the display device depicted in FIG. 13A with the shutter in the CLOSED state.

FIGS. 13A–13B depict a display device 15 according to the invention with a shutter in the OPEN and CLOSED state, respectively. The depicted display device is similar to the previously described display devices that include three reflective spatial light modulators except that the shutter 13 is located between the beam splitter 16 and the light output 50 rather than between the light source 20 and the beam splitter. Specifically the shutter 13 is located within the imaging optics 26, along an imaging optical path 56 connecting an input imaging lens 57, which faces the beam splitter 16, and an output imaging lens 59, which faces the light output 50.

In FIG. 13A, the shutter is in an OPEN state corresponding to the illumination period for the first, second, and third reflective spatial light modulators 60, 62, 64. The light generated by the light source 20 begins traveling through the display device 15 towards the light output 50 by traveling along the illumination optical path 17 towards the reflector 22 where it is reflected towards the collector optics 24. The light is transmitted through the collector optics where it is concentrated towards the beam splitter 16. Before arriving at the beam splitter, however, the light is given a first direction of polarization as it is transmitted through the polarizer 14. The polarized light is then transmitted to the beam splitter 16. The light is then reflected by the beam splitter towards the color separator 66 which separates three distinct wavelength bands from the light generated by the light source. The color separator then reflects or transmits the first, second, and third wavelength band towards the first, second, and third reflective spatial light modulators 60, 62,64, respectively, each of which forms a pixellated image which is reflected back along the output optical path 19 towards the color separator 66. The three reflected pixellated imaged are recombined by the color separator 66 and reflected or transmitted back towards the beam splitter 16. The combined pixellated image is then transmitted by the beam splitter 16 towards the imaging optics 26.

The combined pixellated image is then transmitted by the input imaging lens 57 towards the input transparent electrode 52 of the shutter 13. The input polarization layer (not shown) of the input transparent electrode operates as the analyzer 18 had in the previously described embodiments, absorbing the reflected light from pixels that imparted a first direction of polarization while transmitting the reflected light from pixels which imparted a direction of polarization orthogonal to the first direction. The light which is transmitted through the input transparent electrode 52 is then transmitted through the ferroelectric liquid crystal material 44 where the direction of polarization of the pixels either remains constant or is rotated through 90° depending on the direction of the electric field between the input transparent electrode 52 and the output transparent electrode 48. If the direction of polarization remains constant, the output polarizing layer (not shown) of the output transparent electrode 48 must have a direction of polarization parallel to the direction of polarization of the input polarizing layer (not shown) of the input transparent electrode 52 for the shutter to transmit the pixels towards the output imaging lens 59 and the light output 50 (the OPEN state). Alternatively, if the direction of polarization is rotated, the output polarizing layer (not shown) of the output transparent electrode 48 must have a direction of polarization orthogonal to the direction of polarization of the input polarizing layer (not shown) of the input transparent electrode 52 for the shutter to transmit the pixels towards the output imaging lens 59 and the light output 50 (the OPEN state). The transmitted pixels then are transmitted by the output imaging lens 59 towards the light output 50 where an image is displayed.

If a shutter (mechanical or otherwise) without at least one polarizing layer is used in placed of the ferroelectric liquid crystal based shutter 13 depicted, the analyzer 18 discussed previously must be included in the display device 15.

In FIG. 13B, the shutter is in a CLOSED state corresponding to the balance period for the first, second, and third reflective spatial light modulators 60, 62, 64. The light generated by the light source 20 travels along the illumination optical path 17 and the output optical path 19 through the display device 15 as described above until it reaches the shutter 13. At the shutter, the pixels transmitted by input transparent electrode 52 transmit through the ferroelectric liquid crystal material 44 where the direction of polarization of the pixels either remains constant or is rotated through 90° depending on the direction of the electric field between the input transparent electrode 52 and the output transparent electrode 48. If the direction of polarization remains constant, the output transparent electrode 48 must have an output polarization layer (not shown this Figure) with a direction of polarization orthogonal to the direction of polarization of the input polarization layer (not shown this Figure) for the shutter to prevent the transmission of light along the output optical path 19 beyond the shutter (the CLOSED state). Alternatively, if the direction of polarization is rotated, the output transparent electrode 48 must have an output polarization layer with a direction of polarization parallel to the direction of polarization of the input polarization layer for the shutter to prevent transmission of light along the output optical path 19 towards the light output 50 (the CLOSED state).

In addition to the advantages previously discussed, placing the shutter 13 between the light output 50 and the beam splitter 16 additionally eliminates the potential need for three separate shutters, one for each of the first, second, and third spatial light modulators 60, 62, 64. The use of a single shutter as described, this will introduce one-sixth the number of possible imperfections introduced by shutters located between the color separator 66 and each of the first, second, and third spatial light modulators.

Figure 14A:
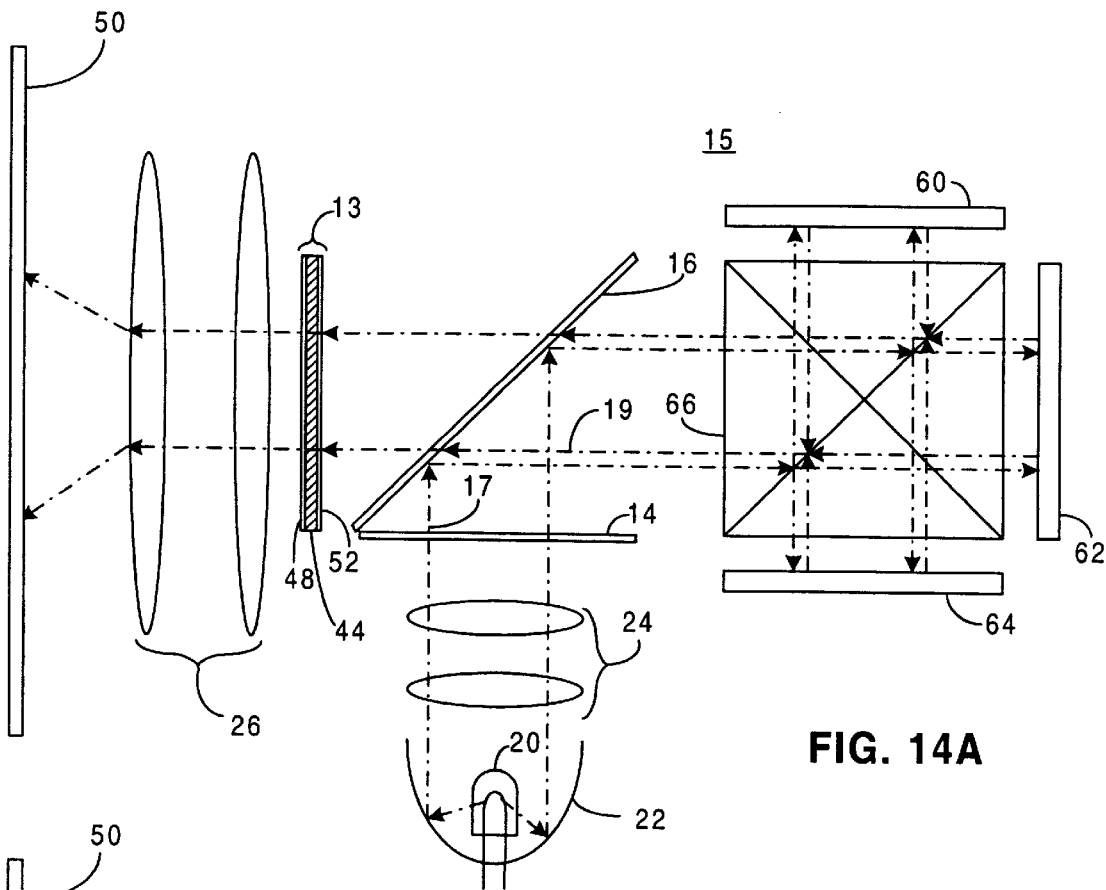
FIG. 14A is a schematic diagram of a display device according to the invention with three reflective spatial light modulators, a beam splitter, and a shutter in the OPEN state located between the imaging optics and the beam splitter.
Figure 14B:
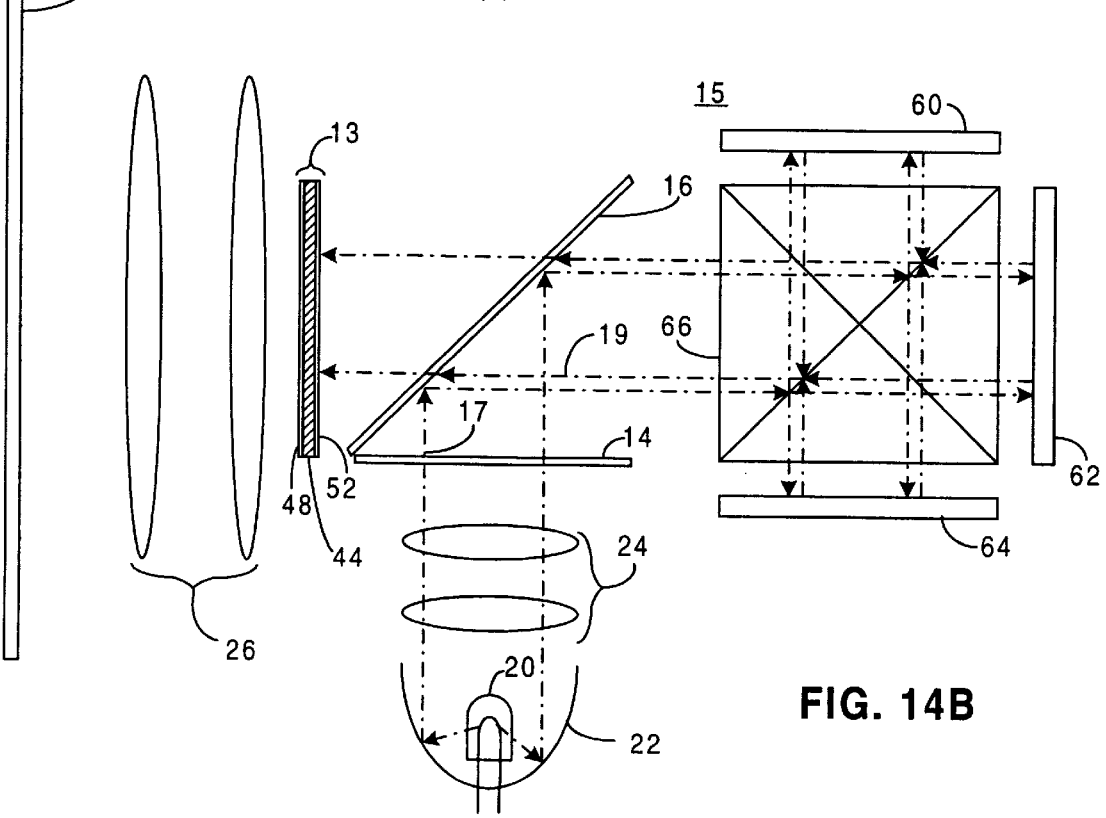
FIG. 14B is a schematic diagram of the display device depicted in FIG. 14A with the shutter in the CLOSED state.

FIGS. 14A–14B depict a display device 15 according to the invention with a shutter in an OPEN and CLOSED state, respectively. The depicted display device is similar to the display device depicted in FIGS. 13A–13B except that the shutter 13 is located and aligned between the beam splitter 16 and the imaging optics 26 rather than between the lenses of the imaging optics 26. The operation of the display device 15 depicted is essentially as previously described, except that when the shutter is in its CLOSED state shown in FIG. 14B, the pixels are prevented from transmitting towards both the imaging optics and the light output 50.

Figure 15A:
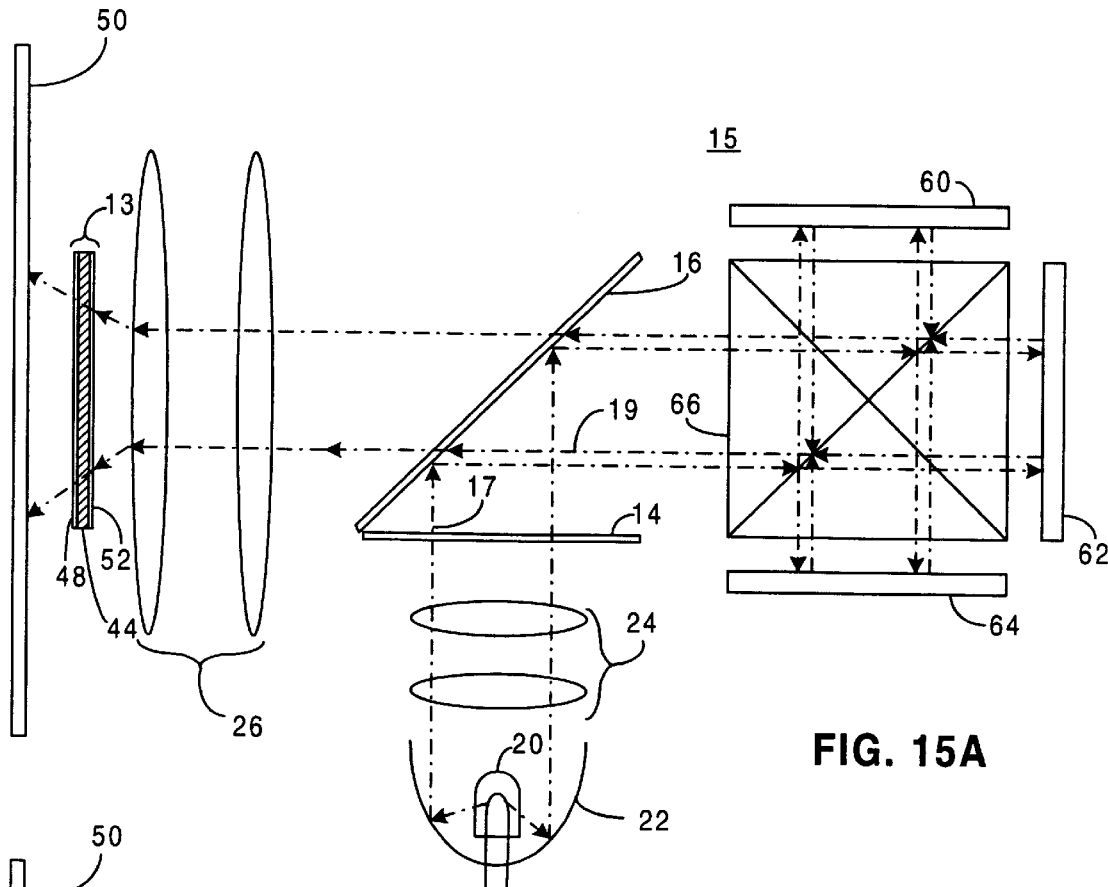
FIG. 15A is a schematic diagram of a display device according to the invention with three reflective spatial light modulators, a beam splitter, and a shutter in the OPEN state located between the imaging optics and the light output.
Figure 15B:
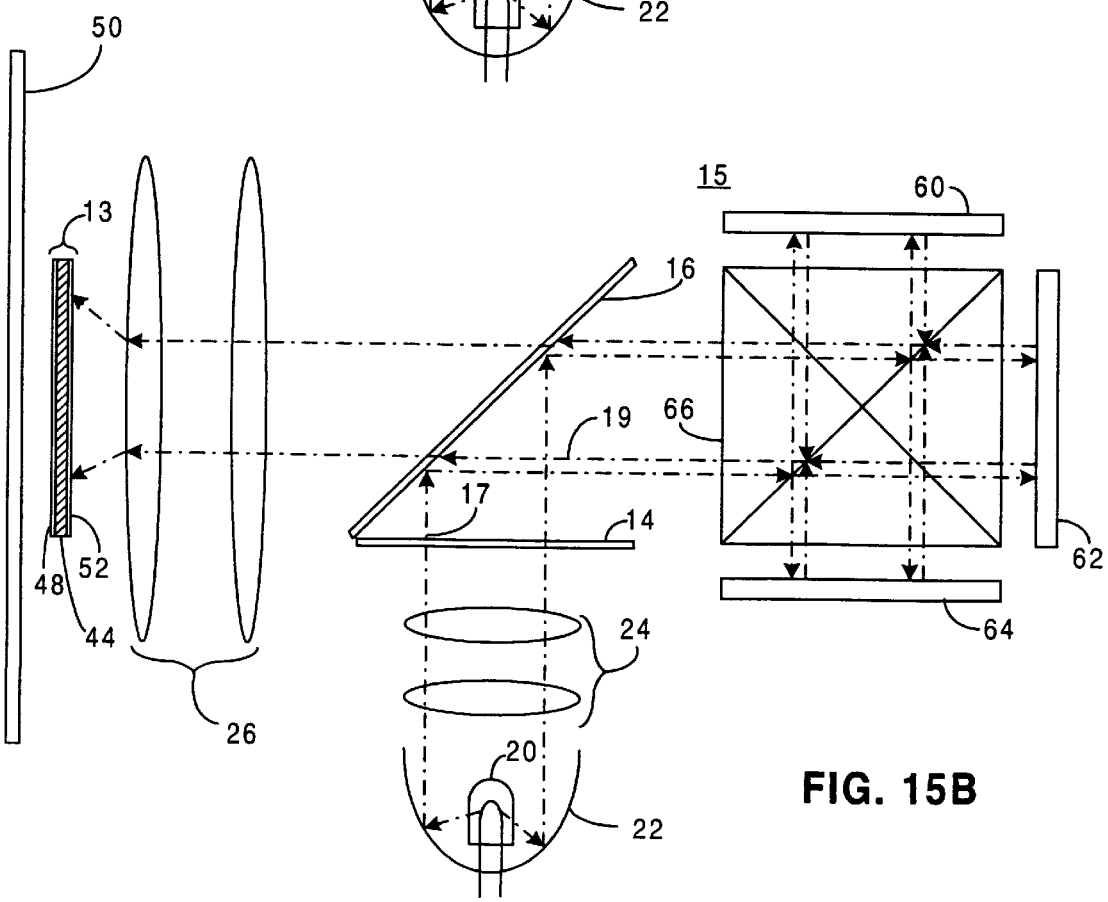
FIG. 15B is a schematic diagram of the display device depicted in FIG. 15A with the shutter in the CLOSED state.

FIGS. 15A–15B depict a display device 15 according to the invention with a shutter in an OPEN and CLOSED state, respectively. The depicted display device is similar to the display device depicted in FIGS. 13A–14B except that the shutter 13 is located and aligned between the light output 50 and the imaging optics 26 rather than between the lenses of the imaging optics 26. The operation of the display device 15 depicted is essentially as previously described, except that when the shutter is in its CLOSED state shown in FIG. 15B, the pixels are still transmitted by the imaging optics 26.

FIGS. 16A–16B depict a display device 15 according to the invention with a shutter in an OPEN and CLOSED state, respectively. The depicted display device is similar to the display device depicted in FIGS. 4A–4B except that the beam splitter 16 has been removed and the light generated by the light source 20 travels along the illumination optical path 17 is reflected at a non-perpendicular angle by the spatial light modulator towards the light output 50 along the output optical path 19.

In FIG. 16A, the shutter is in an OPEN state corresponding to the illumination period for the reflective spatial light modulator 12. The light generated by the light source 20 begins traveling through the display device 15 towards the light output 50 by traveling along the illumination optical path 17 towards the reflector 22 where it is reflected towards the input lens 53 of the collector optics 24. The light is transmitted through the input lens 53 of the collector and is given a first direction of polarization when it is transmitted through the input polarizing layer (not shown) of the input transparent electrode 52 of the shutter 13. The polarized light then travels through the ferroelectric liquid crystal material 44 where the direction of polarization of the light either remains constant or is rotated through 90° depending on the direction of the electric field between the input transparent electrode 52 and the output transparent electrode 48. If the direction of polarization remains constant, the output transparent electrode 48 must have an output polarization layer (not shown this Figure) with a direction of polarization parallel to the direction of polarization of the input polarization layer (not shown this Figure) for the shutter to transmit light towards the spatial light modulator 12 (the OPEN state). Alternatively, if the direction of polarization is rotated, the output transparent electrode 48 must have an output polarization layer with a direction of polarization orthogonal to the direction of polarization of the input polarization layer for the shutter to transmit light towards the spatial light modulator (the OPEN state).

Once the light generated by the light source 20 is transmitted by the output transparent electrode 48 of the shutter 13, it is concentrated and transmitted by the output lens 55 of the collector optics 24 towards the spatial light modulator 12. The reflective spatial light modulator 12 forms a pixelated image in the light which is reflected at an angle along the output optical path 19 towards the light output 50. The light reflected by the reflective spatial light modulator is then transmitted towards the analyzer 18 which blocks pixels having one direction of polarization and transmits pixels to the imaging optics 26 that have an orthogonal direction of polarization. The light is then transmitted by the imaging optics 26 toward the light output 50 where an image is displayed.

If a shutter (mechanical or otherwise) not including at least one polarizing layer is used in place of the preferred ferroelectric liquid crystal-based shutter 13 depicted, the polarizer 14 discussed previously must be included in the display device 15.

In FIG. 16B, the shutter is in a CLOSED state corresponding to the balance period for the reflective spatial light modulator 12. The light generated by the light source 20 begins traveling along the illumination optical path 17 through the display device 15 by traveling towards the reflector 22 where it is reflected towards the input lens 53 of the collector optics 24. The light is transmitted through the input lens 53 of the collector and is given a first direction of polarization when it is transmitted through the input polarizing layer (not shown this Figure) of the input transparent electrode 52 of the shutter 13. The polarized light then travels through the ferroelectric liquid crystal material 44 where the direction of polarization of the light either remains constant or is rotated through 90° depending on the direction of the electric field between the input transparent electrode 52 electrode and the output transparent electrode 48. If the direction of polarization remains constant, the output transparent electrode 48 must have an output polarization layer (not shown this Figure) with a direction of polarization orthogonal to the direction of polarization of the input polarization layer (not shown this Figure) for the shutter to prevent the transmission of light along the illumination optical path 17 beyond the shutter (the CLOSED state). Alternatively, if the direction of polarization is rotated, the output transparent electrode 48 must have an output polarization layer with a direction of polarization parallel to the direction of polarization of the input polarization layer for the shutter to prevent transmission of light along the illumination optical path 17 towards the spatial light modulator 12 (the CLOSED state).

The advantage of the display device depicted in FIGS. 16A–16B over the previously discussed display devices is the need for a beam splitter 16 has been eliminated.

FIGS. 17A–17B depict a display device 15 according to the invention with a shutter in an OPEN and CLOSED state, respectively. The depicted display device is similar to the display device depicted in FIGS. 16A–16B except that the shutter 13 is located and aligned between the light source and the collector optics 24 rather than between the lenses of the collector optics 24. The operation of the display device 15 depicted is essentially as previously described, except that when the shutter is in its CLOSED state shown in FIG. 7B, the light is prevented from transmitting towards both the collector optics and the reflective light modulator.

Figure 18B:
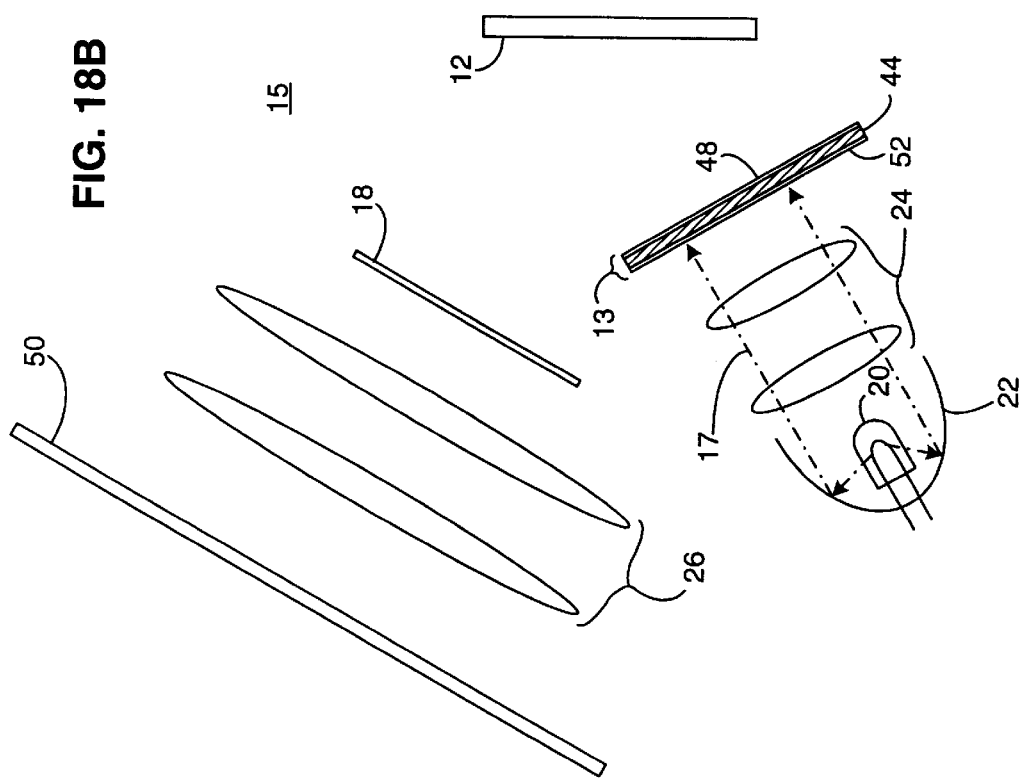
FIG. 18B is a schematic diagram of the display device depicted in FIG. 18A with the shutter in the CLOSED state.
Figure 18A:
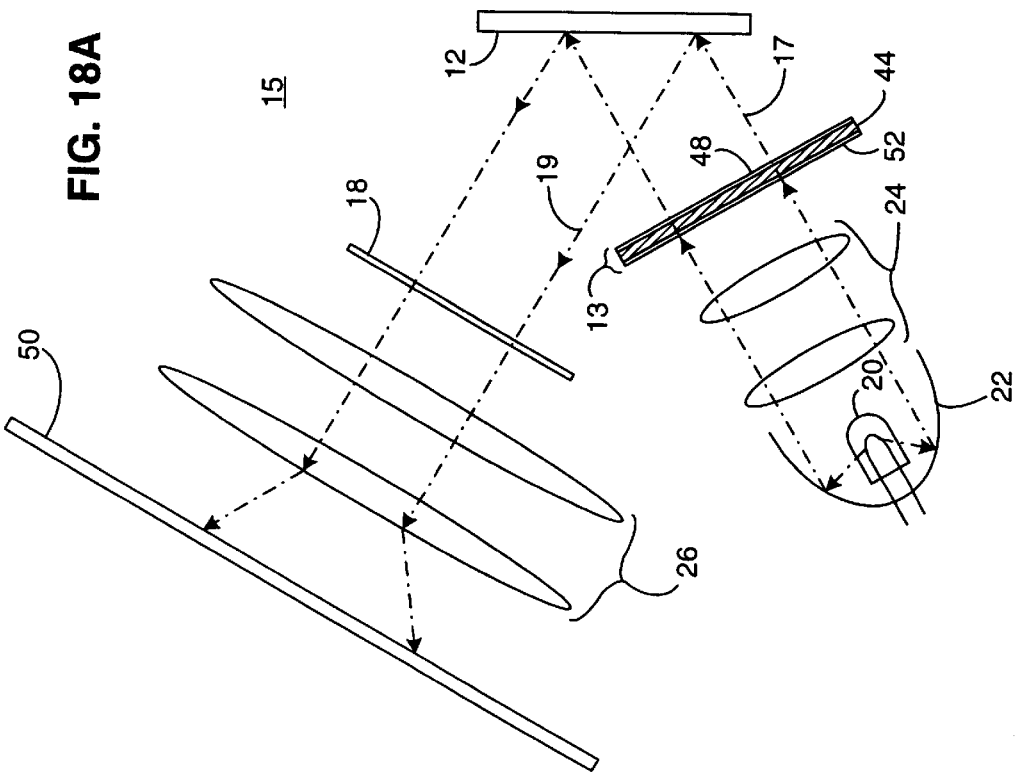
FIG. 18A is a schematic diagram of a display device according to the invention with a single reflective spatial light modulator and a shutter in the OPEN state located between the collector optics and the beam splitter.

FIGS. 18A–18B depict a display device 15 according to the invention with a shutter in the OPEN and CLOSED state, respectively. The depicted display device is similar to the display devices depicted in FIGS. 16A–17B except that the position of the shutter 13 has been shifted so that it is located and aligned between the collector optics 24 and the reflective light modulator 12. The operation of the depicted display device is essentially as previously described, except that light will continue to be transmitted by the collector optics when the shutter is in both the OPEN and CLOSED states.

Figure 19B:
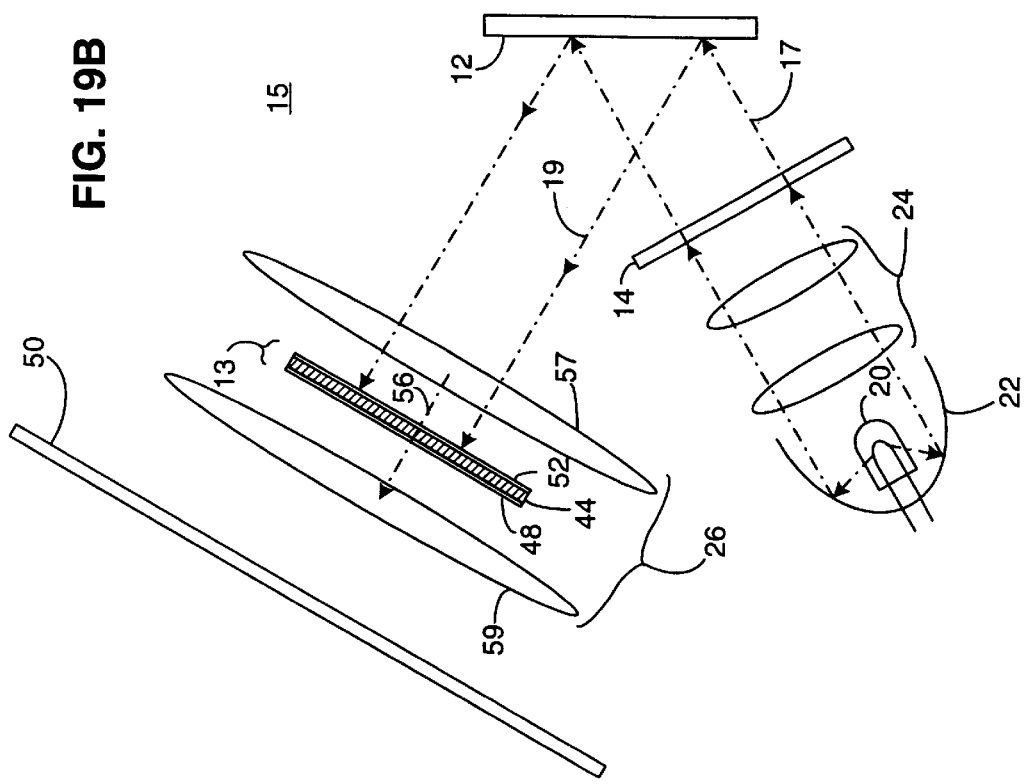
FIG. 19B is a schematic diagram of the display device depicted in FIG. 19A with the shutter in the CLOSED state.
Figure 19A:
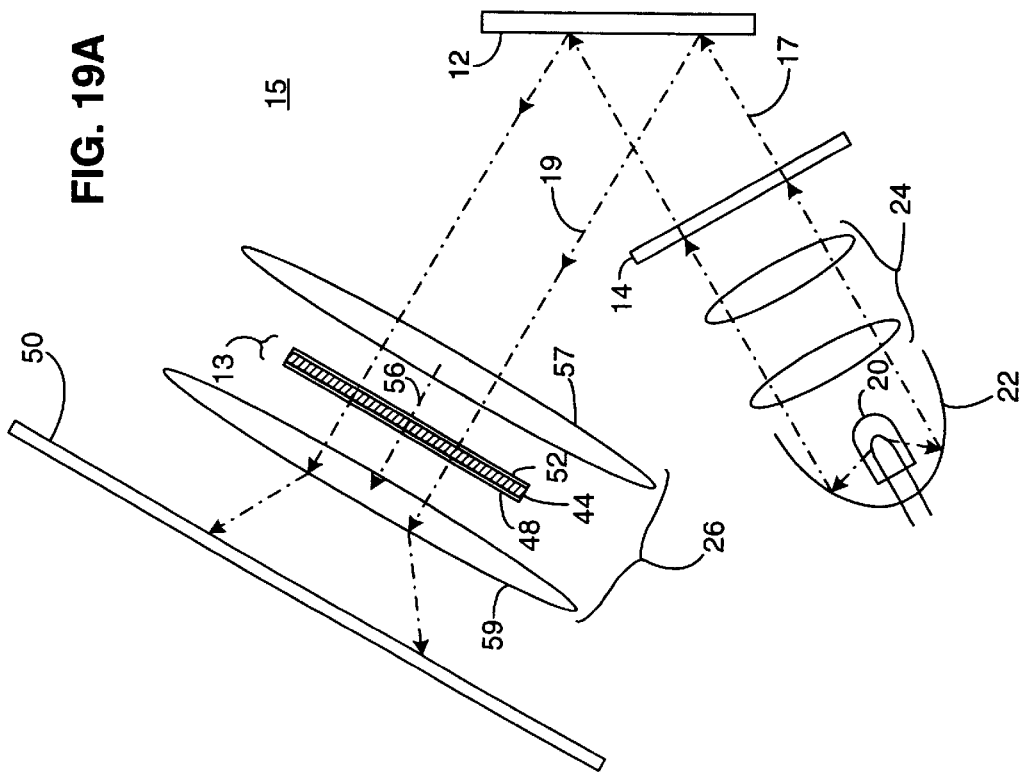
FIG. 19A is a schematic diagram of a display device according to the invention with a single reflective spatial light modulator and a shutter in the OPEN state located within the imaging optics.

FIGS. 19A–19B depict a display device 15 according to the invention with a shutter in the OPEN and CLOSED state, respectively. The depicted display device is similar to the previously described display devices except that the shutter 13 is located along the output optical path 19 between the reflective light modulator and the light output 50 rather than along the illumination optical path 17 between the light source 20 and the reflective light modulator. Specifically the shutter 13 is located within the imaging optics 26, along an imaging optical path 56 connecting an input imaging lens 57, which faces the reflective light modulator 12 and an output imaging lens 59, which faces the light output 50.

In FIG. 19A, the shutter is in an OPEN state corresponding to the illumination period for the reflective spatial light modulator 12. The light generated by the light source 20 begins traveling through the display device 15 towards the light output 50 by traveling along the illumination optical path 17 towards the reflector 22 where it is reflected towards the collector optics 24. The light is transmitted through the collector optics where it is concentrated towards reflective light modulator 12. Before arriving at the reflective light modulator, however, the light is given a first direction of polarization as it is transmitted through the polarizer 14. The reflective spatial light modulator 12 forms a pixellated image in the light generated by the light source 20 and reflects the light containing the pixellated image along the output optical path 19 towards the light output 50.

The light reflected by the spatial light modulator 12 is then transmitted by the input imaging lens 57 towards the input transparent electrode 52 of the shutter 13. The input polarization layer (not shown) of the input transparent electrode operates as the analyzer 18 had in the previously described embodiments, absorbing the reflected light from pixels that imparted a first direction of polarization while transmitting the reflected light from pixels which imparted a direction of polarization orthogonal to the first direction. The light which is transmitted through the input transparent electrode 52 is then transmitted through the ferroelectric liquid crystal material 44 where the direction of polarization of the pixels either remains constant or is rotated through 90° depending on the direction of the electric field between the input transparent electrode 52 and the output transparent electrode 48. If the direction of polarization remains constant, the output polarizing layer (not shown) of the output transparent electrode 48 must have a direction of polarization parallel to the direction of polarization of the input polarizing layer (not shown) of the input transparent electrode 52 for the shutter to transmit the pixels towards the output imaging lens 59 and the light output 50 (the OPEN state). Alternatively, if the direction of polarization is rotated, the output polarizing layer (not shown) of the output transparent electrode 48 must have a direction of polarization orthogonal to the direction of polarization of the input polarizing layer (not shown) of the input transparent electrode 52 for the shutter to transmit the pixels towards the output imaging lens 59 and the light output 50 (the OPEN state). The transmitted pixels then are transmitted by the output imaging lens 59 towards the light output 50 where an image is displayed.

If a shutter (mechanical or otherwise) without at least one polarizing layer is used in placed of the ferroelectric liquid crystal based shutter 13 depicted, the analyzer 18 discussed previously must be included in the display device 15.

In FIG. 19B, the shutter is in a CLOSED state corresponding to the balance period for the reflective spatial light modulator 12. The light generated by the light source 20 travels along the illumination optical path 17 and the output optical path 19 through the display device 15 as described above until it reaches the shutter 13. At the shutter, the pixels transmitted by input transparent electrode 52 transmit through the ferroelectric liquid crystal material 44 where the direction of polarization of the pixels either remains constant or is rotated through 90° depending on the direction of the electric field between the input transparent electrode 52 and the output transparent electrode 48. If the direction of polarization remains constant, the output transparent electrode 48 must have an output polarization layer (not shown this Figure) with a direction of polarization orthogonal to the direction of polarization of the input polarization layer (not shown this Figure) for the shutter to prevent the transmission of light along the output optical path 19 beyond the shutter (the CLOSED state). Alternatively, if the direction of polarization is rotated, the output transparent electrode 48 must have an output polarization layer with a direction of polarization parallel to the direction of polarization of the input polarization layer for the shutter to prevent transmission of light along the output optical path 19 towards the light output 50 (the CLOSED state).

Placing the shutter 13 between the light output 50 and the beam splitter 16 offers the same advantages as those previously discussed.

FIGS. 20A–20B depict a display device 15 according to the invention with a shutter in an OPEN and CLOSED state, respectively. The depicted display device is similar to the display device depicted in FIGS. 19A–19B except that the shutter 13 is located and aligned between the spatial light modulator 12 and the imaging optics 26 rather than between the lenses of the imaging optics 26. The operation of the display device 15 depicted is essentially as previously described, except that when the shutter is in its CLOSED state shown in FIG. 20B, the pixels are prevented from transmitting towards both the imaging optics and the light output 50.

FIGS. 21A–21B depict a display device 15 according to the invention with a shutter in an OPEN and CLOSED state, respectively. The depicted display device is similar to the display device depicted in FIGS. 19A–19B except that the shutter 13 is located and aligned between the light output 50 and the imaging optics 26 rather than between the lenses of the imaging optics 26. The operation of the display device 15 depicted is essentially as previously described, except that when the shutter is in its CLOSED state shown in FIG. 21B, the pixels are still transmitted by the imaging optics 26.

While not depicted in the Figures, it would also be possible to replace the spatial light valve 12 depicted in FIGS. 16A–21B with a color separator 66 and first, second, and third spatial light modulators 60, 62, 64 in a similar fashion to that depicted in FIGS. 10A–15B in order to produce a full color image.

Although this disclosure describes illustrative embodiments of the invention in detail, it is to be understood that the invention is not limited to the precise embodiments described, and that various modifications may be practiced within the scope of the invention defined by the appended claims.

I claim:

1. A ferroelectric liquid crystal-based display device, comprising:
    a light source;
    a reflective spatial light modulator including ferroelectric liquid crystal material; and
    a shutter having an OPEN state and a CLOSED state, the shutter being located and aligned along an illumination optical path between the light source and the modulator, the shutter being in the OPEN state during illumination periods of the modulator, the shutter being in the CLOSED state during balancing periods of the modulator;
    whereby the shutter allows light generated by the source to reach the modulator during the illumination periods; and
    whereby the shutter prevents the light from reaching the modulator during the balancing periods.

2. The display device of claim 1, additionally comprising:
    a beam splitter located along the illumination optical path, the beam splitter additionally located and aligned relative to the shutter and the spatial light modulator to do one of reflect and transmit the light transmitted by the shutter in the OPEN state towards the spatial light modulator, and to do the other of reflect and transmit towards the light output the light reflected by the spatial light modulator.

3. The display device of claim 2, in which:
    the beam splitter has orthogonal directions of maximum transmissivity and maximum reflectivity.

4. The display device of claim 2, additionally comprising:
    collector optics located and aligned between the beam splitter and the light source along the illumination optical path; and
    in which the shutter is located between the collector optics and the beam splitter.

5. The display device of claim 1, additionally comprising:
    collector optics located and aligned along the illumination optical path to concentrate the light generated by the light transmitted along the illumination optical path.

6. The display device of claim 5, in which:
    the shutter is located between the light source and the collector optics.

7. The display device of claim 5, in which:
    the shutter is located between the collector optics and the spatial light modulator.

8. The display device of claim 5, in which:
    the collector optics additionally comprise:
        an input lens facing the light source,
        an output lens facing the beam splitter, and
        a collector optical path optically connecting the input lens to the output lens; and
    the shutter is located along the collector optical path.

9. The display device of claim 1, in which the shutter includes:
    ferroelectric liquid crystal material; and
    a polarizer located between the ferroelectric liquid crystal material and the light source.

10. The display device of claim 9, additionally comprising:
    a beam splitter located along the illumination optical path, the beam splitter additionally located and aligned relative to the shutter, the light output, and the spatial light modulator to do one of reflect and transmit the light transmitted by the shutter in the OPEN state towards the spatial light modulator, and to do the other of reflect and transmit towards the light output the light reflected by the spatial light modulator.

11. A ferroelectric liquid crystal-based display device, comprising:
    a light source;
    first, second, and third reflective spatial light modulators; each including ferroelectric liquid crystal material;
    a color separator, optically connected to the light source by an illumination optical path, the color separator being located and aligned to transmit or reflect a first, second, and third wavelength band from the light generated by the light source towards the first, second, and third reflective spatial light modulators, respectively; and
    a shutter having an OPEN state and a CLOSED state, the shutter being located and aligned along the illumination optical path to transmit the light generated by the light source along the illumination optical path in the OPEN state and to prevent transmission of the light generated by the light source along the illumination optical path beyond the shutter in the CLOSED state, the shutter being in the OPEN state during illumination periods of the modulators, the shutter being in the CLOSED state during balancing periods of the modulators.

12. The display device of claim 11, additionally comprising:
    a beam splitter located along the illumination optical path, the beam splitter additionally located and aligned relative to the shutter and the color separator to do one of reflect and transmit the light transmitted by the shutter in the OPEN state towards the color separator, and to do the other of reflect and transmit towards the light output the light reflected by the spatial light modulators.

13. The display device of claim 12, in which:
    the beam splitter has orthogonal directions of maximum transmissivity and maximum reflectivity.

14. The display device of claim 12, additionally comprising:
    collector optics located and aligned between the beam splitter and the light source along the illumination optical path; and
    in which the shutter is located between the collector optics and the beam splitter.

15. The display device of claim 11, additionally comprising:
    collector optics located and aligned along the illumination optical path to concentrate the light generated by the light transmitted along the illumination optical path.

16. The display device of claim 15, in which:
    the shutter is located between the light source and the collector optics.

17. The display device of claim 15, in which:
    the shutter is located between the collector optics and the color separator.

18. The display device of claim 15, in which:
the collector optics additionally comprise:
an input lens facing the light source,
an output lens facing the beam splitter, and
a collector optical path optically connecting the input lens to the output lens; and
the shutter is located along the collector optical path.

19. The display device of claim 11, in which the shutter includes:
ferroelectric liquid crystal material; and
a polarizer located between the ferroelectric liquid crystal material and the light source.

20. The display device of claim 19, additionally comprising:
a beam splitter located along the illumination optical path, the beam splitter additionally located and aligned relative to the shutter, the light output, and the spatial light modulator to do one of reflect and transmit the light transmitted by the shutter in the OPEN state towards the spatial light modulator, and to do the other of reflect and transmit towards the light output the light reflected by the spatial light modulator.

21. A ferroelectric liquid crystal-based display device, comprising:
a light source;
a reflective spatial light modulator including ferroelectric liquid crystal material;
a light output through which the light generated by the light source is. output after reflection by the spatial light modulator, the light output connected to the spatial light modulator by an output optical path.
a shutter having an OPEN state and a CLOSED state, the shutter being located and aligned along the output optical path to transmit the light generated by the light source along the output optical path in the OPEN state, and to prevent transmission of the light generated by the light source along the output optical path beyond the shutter in the CLOSED state, the shutter being in the OPEN state during illumination periods of the modulator, the shutter being in the CLOSED state during balancing periods of the modulator.

22. The display device of claim 21, additionally comprising:
a beam splitter located along the output optical path, the beam splitter additionally located and aligned relative to the light source, the shutter, and the spatial light modulator to do one of reflect and transmit the light generated by the light source towards the spatial light modulator, and to do the other of reflect and transmit towards the shutter, the light reflected by the spatial light modulator.

23. The display device of claim 21, in which the shutter includes:
ferroelectric liquid crystal material; and
a polarizer located between the ferroelectric liquid crystal material and the light output.

24. A ferroelectric liquid crystal-based display device, comprising:
a light source;
first, second, and third reflective spatial light modulators, each including ferroelectric liquid crystal material;
a light output through which the light generated by the light source is output after reflection by the spatial light modulators;
a color separator, the color separator being located and aligned to transmit or reflect a first, second, and third wavelength band from the light generated by the light source towards the first, second and third reflective spatial light modulators, respectively;
a shutter; and
a beam splitter located and aligned relative to the light source, the shutter, and the color separator to do one of reflect and transmit the light generated by the light source towards the color separator, and to do the other of reflect and transmit towards the shutter the light reflected by the first, second, and third spatial light modulators;
in which the shutter:
includes ferroelectric liquid crystal material and an output polarizer located between the ferroelectric liquid crystal material and the light output,
has an OPEN state and a CLOSED state,
is located and aligned relative to the light output and the beam splitter to transmit the light reflected by the first, second, and third spatial light modulators towards the light output in the OPEN state and to prevent transmission of the light reflected by the first, second, and third spatial light modulators towards the light output in the CLOSED state.

25. The display device of claim 24, additionally comprising:
imaging optics, the imaging optics located and aligned relative to the light output and the beam splitter to focus the light reflected by the first, second, and third spatial light modulators for display.

26. The display device of claim 25, in which:
the shutter is located between the light output and the imaging optics.

27. The display device of claim 25, in which:
the shutter is located between the imaging optics and the beam splitter.

28. The display device of claim 25, in which:
the imaging optics additionally comprise:
an imaging input lens facing the beam splitter,
an imaging output lens facing the light output, and
an imaging optical path optically connecting the imaging input lens to the imaging output lens; and
the shutter is located along the imaging optical path.

* * * * *